(12) United States Patent
Kwak

(10) Patent No.: US 11,335,143 B2
(45) Date of Patent: May 17, 2022

(54) PRIVACY CONTROL-ADJUSTABLE COMMERCIAL VEHICLE ELECTRONIC LOGGING DEVICE (ELD) AND TRIP DATA-SHARING SYSTEM BETWEEN A TRANSPORTATION COMPANY AND A THIRD-PARTY CORPORATE PARTNER ENTITY

(71) Applicant: TrueLite Trace, Inc., San Jose, CA (US)

(72) Inventor: Sung Bok Kwak, San Jose, CA (US)

(73) Assignee: Truelite Trace, Inc., San Jose, CA (US)

( * ) Notice: Subject to any disclaimer, the term of this patent is extended or adjusted under 35 U.S.C. 154(b) by 803 days.

(21) Appl. No.: 16/240,787

(22) Filed: Jan. 6, 2019

(65) Prior Publication Data
US 2020/0219337 A1    Jul. 9, 2020

(51) Int. Cl.
| | |
|---|---|
| *G07C 5/08* | (2006.01) |
| *G07C 5/00* | (2006.01) |
| *G06F 21/36* | (2013.01) |
| *G06F 21/78* | (2013.01) |
| *G06F 21/62* | (2013.01) |

(52) U.S. Cl.
CPC ........... *G07C 5/0858* (2013.01); *G06F 21/36* (2013.01); *G06F 21/6272* (2013.01); *G06F 21/78* (2013.01); *G07C 5/008* (2013.01)

(58) Field of Classification Search
CPC .... G07C 5/0858; G07C 5/008; G07C 5/0841; G06F 21/36; G06F 21/6275; G06F 21/78; G06F 2221/2113; G06F 2221/2141; G06F 21/6245; H04W 4/44; G06Q 10/20; G06Q 40/08; G06Q 50/30; G08Q 1/20
See application file for complete search history.

(56) References Cited

U.S. PATENT DOCUMENTS

| | | | |
|---|---|---|---|
| 2018/0111494 A1 * | 4/2018 | Penilla | B60L 55/00 |
| 2020/0034550 A1 * | 1/2020 | Kim | H04L 9/0861 |

FOREIGN PATENT DOCUMENTS

| | | | | |
|---|---|---|---|---|
| CN | 112074856 A | * | 12/2020 | H04L 9/3226 |
| WO | WO-2011053357 A1 | * | 5/2011 | H04W 12/50 |

* cited by examiner

*Primary Examiner* — Mary Cheung
(74) *Attorney, Agent, or Firm* — Invent Capture, LLC.; Samuel S. Cho

(57) ABSTRACT

A novel privacy control-adjustable commercial vehicle ELD and trip data-sharing system and a related method of operation provide a dynamically-adjustable access grant or denial of privacy-sensitive and competitive intelligence-sensitive commercial fleet vehicle operations information to a third-party corporate partner entity of a transportation company, based on a trip data-share authorizer's response to an electronic request made by the third-party corporate partner entity. In one embodiment, vehicle information is categorized into a mandatory disclosure dataset and a privacy-adjustable dataset, wherein the mandatory disclosure dataset is disclosed to a vehicle monitoring personnel or an authorized third-party corporate partner entity at all times within a prespecified time limit, while the privacy-adjustable dataset is only selectively accessible when the trip data share authorizer explicitly grants access via an electronic user interface connected to the privacy control-adjustable commercial vehicle ELD and trip data-sharing system, upon entry of a correct or authenticated partner key.

18 Claims, 20 Drawing Sheets

A Dataflow Diagram for Various Entities Utilizing the TripShare System

200

A TripShare System Settings Menu for Privacy-Adjustable Commercial Vehicle Operating Parameter Access Authorization to a Third-Party Corporate Partner

Real-Time Transport Vehicle and Transported Asset Tracking Interfaces Generated by the TripShare System

400

Assigning a Partner Key in the TripShare System to Authorize a Third-Party Corporate Partner Access to a Trucking Company's Privacy-Adjustable Real-Time Commercial Vehicle Operating and/or Asset Tracking Parameters

500

| | |
|---|---|
| Partner Key Apply | ✕ |
| My Company Name | Motor Carrier |
| My Name | John Manager |
| My Email Address | john@fleetup.com |
| My Phone Number | |
| Partner Name | RD Logistics ✓ |
| Partner Business Type | Logistics ▼ |
| Partner Address | 675 N First Street, San Jose, CA ✓ |
| Contact Person Name | Steve Trieu ✓ |
| Contact Person Email Address | strieu@fleetup.com ✓ |
| Contact Person Phone Number | |
| Apply | |
| | Close |

A Third-Party Corporate Partner Entity Applying for a Partner Key in the TripShare System to Gain Access to a Trucking Company's Privacy-Adjustable Real-Time Commercial Vehicle Operating and/or Asset Tracking Parameters

Authorizing Specific Privacy-Adjustable Real-Time Commercial Vehicle Operating and/or Asset Tracking Applications to Share with an Authorized Third-Party Corporate Partner Entity

700

Logistics Broker Completing Its Registration in the TripShare System as an Authorized Commercial Fleet Vehicle Data-Sharing Partner

TripShare System Authorizing Trip Data Sharing for One Particular Vehicle Only with the Third-Party Corporate Partner Entity from a Plurality of Commercial Fleet Operation Vehicles

| Share Vehicles | | | |
|---|---|---|---|
| Device ID | Vehicle Name | License # | Operation |
| test1 | | 101 | |
| 213GL2015011319 | | 102 | |
| 213GL2015011691 | | 103 | |
| 213GL2015011641 | | 104 | |

The TripShare System Revoking Data-Sharing Privilege for a Particular Vehicle from the Third-Party Corporate Partner Entity

The TripShare System Sharing Location Data of a Data Share-Authorized Commercial Vehicle with the Third-Party Corporate Partner Entity

1100

The TripShare System Sharing Real-Time Trip Data of a Data Share-Authorized Commercial Vehicle by Destination with the Third-Party Corporate Partner Entity

1200

| Register Track ID | |
|---|---|
| Vehicle | |
| License | 201 |
| Start Address | 5430-5450 Glen Rd, Coopersburg, PA 18036, USA |
| Destination Address | 409 Alpine St, Emmaus, PA 18049, USA |
| Check-of-Arrival Radius | 300m (0.18 miles) |
| Shipping Number | A3301 |
| Customer | Ronald Day |
| Sharing Start Time | 03/30/2018 14:53:21 |
| Sharing End Time | 04/02/2018 |

Please write a note to be seen by your client.

Testing Trip Data Sharing Mode. Sending Vehicle 201 to RD Logistics.

68/300 letters

Cancel

The TripShare System Enabling Turn-by-Turn Map-Based Real-Time Shipment Item Tracking Originating from a Data Share-Authorized Commercial Vehicle via a Track ID Registration with the Third-Party Corporate Partner Entity

TripShare Mode

| Application (Tab Title) | Data | |
|---|---|---|
| Per Trip (On Map Tab) | 10s. GPS Tracking on Map with Live Traffic | GOLD |
| Vehicle Assignment Setting | Shared Vehicle Directory by the expiration | |
| | Tracking ID Service | Diamond |
| Vehicle | Vehicle Year/Maker/Model | |
| | Driving Hours | GOLD |
| | Mileage | GOLD |
| | Last Known Location | GOLD |
| | Trip history with Replay Video | |
| | SEND Trip history ( Airplane icon ) | Diamond |
| | Fuel Consumption | |
| | Sorting by Company | |
| | Odometer | GOLD |
| | Engine Hours | |
| | # of Speeding | |
| | # of RPM | |
| | # of Engine Code Alert | |
| | # of Battery Level Alert | |
| | # of Engine Temp. Alert | |
| Compliance | HOS Status | Diamond |
| | Driver Name | GOLD |
| | Driver Phone Number | GOLD |
| | Driver E-mail | |
| | HOS Logs | |
| Alert | Speeding events, location on map | GOLD |
| | Idling events, location on map | GOLD |
| | RPM events, location on map | GOLD |
| | Engine Code data & Description | GOLD |
| | Battery Level | GOLD |
| | Engine Temp | GOLD |

An Example of "Tiered" (e.g. Gold, Diamond) TripShare Information Accessibility from a Data Share-Authorized Commercial Vehicle to the Third-Party Corporate Partner Entity

Mandatory Disclosure and Privacy-Adjustable Dataset Separations in the TripShare System Utilized by a Trucking Company and a Third-Party Corporate Partner Entity

1500

A Dataflow Block Diagram of the TripShare System Utilized by a Trucking Company and a Third-Party Corporate Partner Entity

1600

Real-Time Transport Vehicle Parameters Synthesized by a Privacy Control-Adjustable Onboard Vehicle Monitoring Device and Dynamically Sharable with a Third-Party Corporate Partner Entity Upon Authorization by the TripShare System

1700

Privacy Control-Adjustable Commercial Vehicle Monitoring Components for the TripShare System

1800

A Block Diagram Example for a Privacy Control-Adjustable Onboard Vehicle Monitoring Device Executing a TripShare App

1900

| Fleet Industry | TS Partner/Customer | Data Demands | Application | ETA Service |
|---|---|---|---|---|
| Transportation | Broker / Logistics | Vehicle / Asset on Map (visibility), Trip History, HOS status, Driver Information, Speeding, Idling, Tracking ID Service | 1. Asset / Vehicle Visibility 2. ETA for Pick up and Delivery 3. SEND Trip History to the Customer 4. Trip analysis with ETA and Actual Arrival 5. Arrival Confirmation | 1. Pickup Customer 2. Delivery Customer |
| | Maintenance Service Center | Vehicle on Map, Maker/Model/Year, Odometer, Engine Hours, Engine Code, Battery level, Engine Temperature, eMaintenance* | 1. Remote Diagnostics 2. Priotize the Maintenance Service by Vehicle 3. Preventative / Schedule Maintenance as a 3rd party | |
| | Insurance | Maker/Model/Year, Odometer, Engine Hour, Speeding, RPM, Idling, Hard Accel/Brake*, Driver Information, Driver Safety Scoring* | 1. Apply Realtime Data to Risk Managment 2. Apply Discount Rate by Criteria 3. Safe Driving Coaching | |
| Construction | Construction Customers | Vehicle / Asset on Map - Visibility, HOS Status, Speeding, RPM, idling | 1. Visibility of the Construction Site to the Customer 2. Speeding Detection on Construction Site | |
| | Retail / Distribution | Vehicle / Asset on Map (visibility), Trip History, Speeding, Idling, Tracking ID Service | 1.Vehicle Visibility on Map 2. ETA for Delivery 3. Arrival Confirmation 4. SEND Trip History to the Customer | Delivery Customers |

2100

An Example of Industry & Partner-Specific Commercial Vehicle Data Access Desirability from a TripShare System-Equipped Trucking Company

FIG. 21

PRIVACY CONTROL-ADJUSTABLE COMMERCIAL VEHICLE ELECTRONIC LOGGING DEVICE (ELD) AND TRIP DATA-SHARING SYSTEM BETWEEN A TRANSPORTATION COMPANY AND A THIRD-PARTY CORPORATE PARTNER ENTITY

BACKGROUND OF THE INVENTION

The present invention generally relates to commercial fleet vehicle and transported asset monitoring and sophisticated information control methods and systems. More specifically, various embodiments of the present invention relate to corporate privacy control-adjustable commercial vehicle electronic logging and trip data-sharing systems and related methods of operations between a transportation company and a third-party corporate partner entity.

Vehicle monitoring systems for vehicle drivers are becoming increasingly ubiquitous. For example, OnStar systems offer cellular signal and satellite signal-based vehicle monitoring and communications between an onboard transceiver device in a vehicle and a vehicle monitoring station. Emergency location tracking of the vehicle, emergency vehicle door unlocks, and subscription fee-based voice navigational guidance via the onboard transceiver device and the vehicle monitoring station are some of the conventional offerings from the OnStar systems and other vehicle-tracking service providers.

Furthermore, commercial fleet vehicle operators, such as trucking companies and transportation operators, are also becoming more interested in monitoring their vehicles using various computer interfaces. For example, a trucking company may want to check whereabouts, driving habits, and vehicle safety profiles of their hired commercial vehicle drivers. Although some existing solutions in the market today allow digitized tracking of commercial vehicles for supervisory and regulatory compliance requirements, the conventional commercial vehicle tracking capabilities are confined to internal corporate applications, and much of the commercial vehicle trip or in-vehicle sensor data obtained from a particular vehicle fleet remain isolated from broader utilization of data with outside partner entities or regulators, for the fear of driver-specific or corporate-specific privacy violations. Importantly, giving an outside entity an unfettered access to a vast amount of intra-corporate commercial vehicle trip and in-vehicle sensor data generated from a commercial vehicle fleet of an organization may pose a significant competitive intelligence and trade secret violation risks to the organization.

Moreover, conventional commercial vehicle tracking solutions are generally incapable of sophisticated monetization and related authorizations of dynamically-created commercial vehicle trip and/or in-vehicle sensor data with outside partner entities per each sensor refresh cycle, as such datasets in conventional solutions are not appropriately categorized and managed for monetization with potential outside partner entities and industries. The data monetization market for the dynamically-created commercial vehicle trip and/or in-vehicle sensor data from a trucking company or another commercial transportation fleet organization can be substantial, as interested outside partners and industries may include highly-motivated participants, such as logistics brokers, retailers, product distributors, construction equipment companies, vehicle insurance companies, vehicle maintenance shops, safety consultants, and regulatory agencies, which can benefit from having a direct electronic access to dynamically-created commercial vehicle trip and/or in-vehicle sensory data for real-time transported asset monitoring, real-time risk variable assessments related to driver behaviors or equipment failures, and real-time regulatory and safety compliances.

In addition, some commercial vehicle drivers or commercial vehicle fleet operators may also desire a personal or corporate privacy-adjustable solution that keeps an outside partner entity away from monitoring what can be considered private and sensitive information, such as vehicle speed, past and current vehicle locations categorized by time, and other privacy-sensitive information, especially for off-duty hours or for trips irrelevant to the outside partner.

Therefore, it may be desirable to devise a novel privacy control-adjustable commercial vehicle electronic logging and trip data-sharing system that provides multiple data access depth authorization and monetization capabilities between a transportation company and a third-party corporate partner entity to the transportation company.

Furthermore, it may also be desirable to devise a novel privacy control-adjustable commercial vehicle electronic logging and trip data-sharing system that enables the third-party corporate partner entity to gain onetime timer limit-based or itinerary-based in-vehicle sensor and trip-related data access rights from an underlying commercial vehicle monitoring system operated by the transportation company.

In addition, it may also be desirable to devise a novel dataset categorization scheme in the privacy control-adjustable commercial vehicle electronic logging and trip data-sharing system to create multiple-tier data access privileges that categorizes a "must-disclose" mandatory dataset and multiple tiers of privacy-adjustable datasets customized for industry-specific needs of third-party corporate partners in various industries, such as logistics brokers, retailers, product distributors, construction equipment companies, vehicle insurance companies, vehicle maintenance shops, safety consultants, and regulatory agencies.

Moreover, it may also be desirable to provide one or more flexible user interfaces that enable a transportation company operator or a commercial vehicle driver to grant or deny requests by third-party corporate partners to access privacy-adjustable datasets accumulated by the transportation company operator.

Additionally, it may be also desirable to provide a novel wild card mode that grants a vehicle monitoring personnel or a third-party corporate partner a time-limited and frequency-limited access to currently-private datasets based on an explicit pre-arranged agreement with a commercial vehicle driver.

SUMMARY

Summary and Abstract summarize some aspects of the present invention.

Simplifications or omissions may have been made to avoid obscuring the purpose of the Summary or the Abstract. These simplifications or omissions are not intended to limit the scope of the present invention.

In one embodiment of the invention, a privacy control-adjustable commercial vehicle electronic logging device (ELD) and trip data-sharing system between a transportation company and a third-party corporate partner entity is disclosed. This privacy control-adjustable commercial vehicle ELD and trip data-sharing system comprises:

a privacy control-adjustable onboard vehicle monitoring device capable of storing a vehicle information dataset collected from a vehicle's onboard computer or another vehicle-attached equipment;

a computer server with a CPU and a memory unit, wherein the computer server is operated by a vehicle monitoring personnel from the transportation company;

a vehicle monitoring and trip data-sharing software module at least partially executed on the CPU and the memory unit of the computer server operated by the vehicle monitoring personnel from the transportation company, wherein the vehicle monitoring and trip data-sharing software module includes a mandatory disclosure dataset monitoring sub-module, a privacy-adjustable dataset monitoring sub-module, a privacy-adjustable dataset access authorization decision sub-module, and a trip data-share authorization timer for the third-party corporate partner entity's time-limited case-by-case or trip-by-trip access to the privacy control-adjustable onboard vehicle monitoring device and the vehicle information dataset collected from the vehicle's onboard computer or another vehicle-attached equipment;

a wireless transceiver unit either integrated into or operatively connected to the privacy control-adjustable onboard vehicle monitoring device for transmission of at least a portion of the vehicle information dataset from the privacy control-adjustable onboard vehicle monitoring device to the computer server operated by the vehicle monitoring personnel;

the vehicle information dataset comprising a mandatory disclosure dataset and a privacy-adjustable dataset, wherein the mandatory disclosure dataset is shared with the third-party corporate partner entity external to the transportation company, when a partner key entered into the computer server is correct, and wherein the privacy-adjustable dataset is not shared with the third-party corporate partner entity even when the partner key entered into the computer server is correct, unless the privacy-adjustable dataset is currently flagged by the transportation company to grant access to the third-party corporate partner entity external to the transportation company; and a trip data share authorizer's user interface device belonging to the transportation company that grants or denies a privacy-adjustable data access request by the vehicle monitoring personnel or the third-party corporate partner entity.

In another embodiment of the invention, a method of operating a privacy control-adjustable commercial vehicle ELD and trip data-sharing system for a particular privacy control adjustment in a vehicle is disclosed. This method comprises the steps of:

1. Requesting a permission, with a partner key synthesized from a third-party corporate partner entity's electronic user interface connected to the privacy control-adjustable commercial vehicle ELD and trip data-sharing system, to open a private data field in a privacy-adjustable dataset of a vehicle information dataset originating from a vehicle operated by a transportation company, wherein the permission is transmitted by an electronic data network;

2. Granting or denying the permission request by the third-party corporate partner entity using a trip data share authorizer's user interface device, which transmits a response signal to the privacy control-adjustable commercial vehicle ELD and trip data-sharing system for granting or denying access to the private data field;

3. Receiving the response signal in the privacy control-adjustable commercial vehicle ELD and trip data-sharing system operated by the transportation company; and 4. If the response signal grants the access to the private data field: changing a data access flag for the private data field to "third-party corporate partner monitoring of commercial vehicle-generated vehicular parameters allowed"; and accessing the private data field, which is now allowed for additional monitoring by the third-party corporate partner entity external to the transportation company;

5. Else, if the response signal denies the access to the private data field: keeping the private data field private from information access by the third-party corporate partner entity.

BRIEF DESCRIPTION OF DRAWINGS

FIG. 3 shows a TripShare system settings menu for privacy-adjustable commercial vehicle operating parameter access authorization to a third-party corporate partner, in accordance with an embodiment of the invention.

FIG. 6 shows a user interface for a third-party entity applying for a partner key in the TripShare system to gain access to a trucking company's privacy-adjustable real-time commercial vehicle operating and/or asset tracking parameters, in accordance with an embodiment of the invention.

FIG. 8 shows a user interface for a third-party corporate partner entity (e.g. a logistics broker) completing its registration in the TripShare system as an authorized commercial fleet vehicle data-sharing partner, in accordance with an embodiment of the invention.

FIG. 9 shows a user interface authorizing trip data sharing for one particular vehicle only with a third-party corporate partner entity from the transportation company's commercial fleet operation vehicles monitored by the TripShare system, in accordance with an embodiment of the invention.

FIG. 10 shows a user interface in the TripShare system revoking data-sharing privilege for a particular vehicle from a third-party corporate partner entity, in accordance with an embodiment of the invention.

FIG. 13 shows the TripShare system enabling turn-by-turn map-based real-time shipment item tracking originating from a data share-authorized commercial vehicle via a track ID registration with a third-party corporate partner entity, in accordance with an embodiment of the invention.

FIG. 14 shows an example of "tiered" (e.g. gold, diamond) TripShare information accessibility from a data share-authorized commercial vehicle to a logistics broker or another client, in accordance with an embodiment of the invention.

FIG. 21 shows an example of industry and partner-specific commercial vehicle data access desirability from a TripShare system-equipped trucking company, in accordance with an embodiment of the invention.

DETAILED DESCRIPTION

Figure 1:
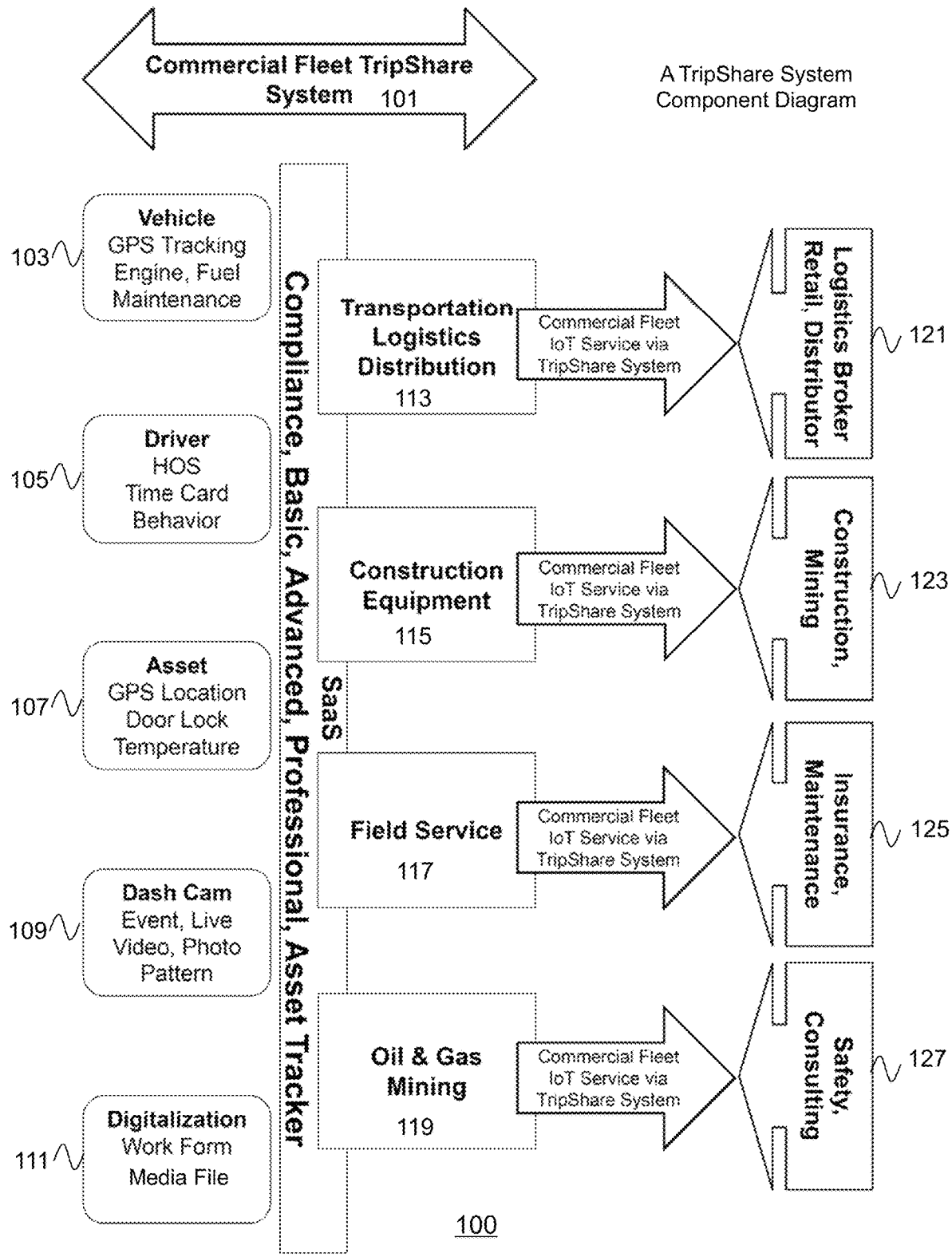
FIG. 1 shows a system component diagram for a privacy control-adjustable commercial vehicle electronic logging device (ELD) and trip data-sharing system between a transportation company and a third-party corporate partner entity, named herein as the "TripShare" system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more privacy control-adjustable commercial vehicle electronic logging device (ELD) and trip data-sharing system between a transportation company and a third-party corporate partner entity, or methods of operating such novel systems. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a "TripShare" system is defined as a privacy control-adjustable commercial vehicle electronic logging device (ELD) and trip data-sharing system between a transportation company and a third-party corporate partner entity. In a preferred embodiment of the invention, the commercial vehicle electronic logging device (ELD) is one of several system components in the privacy control-adjustable commercial vehicle electronic logging device (ELD) and trip data-sharing system. In one embodiment, the commercial vehicle electronic logging device (ELD) may be part of an onboard vehicle monitoring device, which is physically installed inside a commercial vehicle and communicates in-vehicle sensor and engine control unit (ECU) data parameter readings to a remote monitoring station via at least one of cellular, satellite, land-mobile, and other wireless data networks. In another embodiment, the commercial vehicle electronic logging device (ELD) may be operatively connected to the onboard vehicle monitoring device, and provides at least one of driver on-duty and off-duty electronic logging capabilities, driver regulatory compliance violation analysis, driver behavioral violation analysis, driver-specific vehicle maintenance analysis based on driver behavioral patterns, and ELD compliance violation alert capabilities to a commercial fleet operations monitoring station of a transportation company.

Furthermore, for the purpose of describing the invention, a "vehicle" is defined as a truck, a van, a bus, a passenger car, a sports utility vehicle (SUV), a motorcycle, a construction service equipment with or without wheels, or an oil or mining service equipment with or without wheels.

Moreover, for the purpose of describing the invention, a "third-party corporate partner entity" is defined as an outside business entity external to and separate from a transportation company, wherein the outside business entity has a vested logistical, financial, and/or regulatory compliance interest in real-time vehicle data analytics from a commercial vehicle fleet operated and managed by the transportation company. Examples of third-party corporate partner entities include, but are not limited to, logistics brokers, retailers, product distributors, construction or mining equipment companies, vehicle insurance companies, vehicle maintenance shops, safety consultants, and regulatory agencies.

In addition, for the purpose of describing the invention, an "onboard vehicle monitoring device" is defined as an electronic device installed in a vehicle to collect and/or analyze a variety of vehicle-related data. This device may also be integrated into or connected to a commercial vehicle ELD. In one example, a vehicle's onboard computer outputs many data parameters in real-time, such as vehicle diagnostic information (e.g. engine temperature, oil level, OBD codes, and etc.), speed information, engine rotation-per-minute (RPM) information, fuel levels, and miles driven relative to time. These data parameters can be part of the vehicle-related data collected and analyzed by an onboard vehicle monitoring device. Furthermore, the onboard vehicle monitoring device may also act as a "vehicle black box" to collect and record multimedia information associated with a particular vehicle, such as video and/or audio footage of the vehicle's interior or exterior, if the onboard vehicle monitoring device is connected to a camera and/or a microphone in the particular vehicle. Preferably, the information collected and recorded from the onboard vehicle monitoring device is wirelessly transmitted to a vehicle monitoring station or a supervising entity's computer server for monitoring, alert, and additional analysis. A privacy control-adjustable onboard vehicle monitoring device in accordance with an embodiment of the invention is an example of an onboard vehicle monitoring device.

Furthermore, a "vehicle monitoring system" refers to a networked electronic and data communication infrastructure and computerized user interface devices among vehicles, a vehicle monitoring station, and/or a supervising entity of vehicles from a particular transportation company (e.g. a trucking company, a courier service company, a construction equipment service company, a bus operator, etc). The vehicle monitoring system may include a privacy control-adjustable onboard vehicle monitoring device installed in a vehicle, a wireless transceiver either integrated with or operatively connected to the privacy control-adjustable onboard vehicle monitoring device, a cellular base station, a GPS satellite, a computer server for a supervising entity or a vehicle monitoring personnel, and a computerized interface for the supervising entity or the vehicle monitoring personnel.

In a preferred embodiment of the invention, the vehicle monitoring system may be a sub-system of a TripShare system (i.e. a privacy control-adjustable commercial vehicle electronic logging device (ELD) and trip data-sharing system between a transportation company and a third-party corporate partner entity), wherein the TripShare system further includes in-vehicle ECU, in-vehicle sensor, and in-vehicle shipment condition real-time readout data sharing authorization and revocation capabilities and related user interfaces operated by the transportation company for sharing targeted industry-specific data readouts with a third-party corporate partner entity. Examples of third-party corporate partner entities include, but are not limited to, logistics brokers, retailers, product distributors, construction equipment companies, vehicle insurance companies, vehicle maintenance shops, safety consultants, and regulatory agencies, which can benefit from having a direct electronic access to dynamically-created commercial vehicle trip and/or in-vehicle sensory data for real-time transported asset monitoring, real-time risk variable assessments related to driver behaviors or equipment failures, and real-time regulatory and safety compliances.

In addition, for the purpose of describing the invention, a "driver's user interface," or a "trip data share authorizer's user interface," is defined as a computerized user interface operating in an electronic device, which is configured to enable a driver or a transportation company's operator to grant or deny a third-party corporate partner an authorization to access to certain datasets collected by a TripShare system.

Furthermore, for the purpose of describing the invention, a "vehicle monitoring personnel" is defined as a monitoring service provider's employee (e.g. an OnStar employee) for monitoring vehicle activities and driving behaviors, or a supervising entity that monitors vehicle activities and driving behaviors. Examples of supervising entities include, but are not limited to, commercial vehicle operators' employees responsible for monitoring fleet vehicles or regulatory agencies, In addition, for the purpose of describing the invention, a "computer server" is defined as a physical computer system, another hardware device, a software module executed in an electronic device, or a combination thereof. For example, in context of an embodiment of the invention, a "computer server" is dedicated to executing one or more computer programs for receiving, processing, analyzing, and/or monitoring data from a privacy control-adjustable onboard vehicle monitoring device and a TripShare system. Furthermore, in one embodiment of the invention, a computer server is connected to one or more data networks, such as a local area network (LAN), a wide area network (WAN), a cellular network, and the Internet. Moreover, a computer server can be used by a vehicle monitoring personnel for gathering and analyzing data from one or more privacy control-adjustable onboard vehicle monitoring devices, which are installed in one or more monitored vehicles.

One aspect of an embodiment of the present invention is providing a novel privacy control-adjustable commercial vehicle electronic logging and trip data-sharing system that provides multiple data access depth authorization and monetization capabilities between a transportation company and a third-party corporate partner entity to the transportation company.

Another aspect of an embodiment of the present invention is providing a novel privacy control-adjustable commercial vehicle electronic logging and trip data-sharing system that enables the third-party corporate partner entity to gain onetime timer limit-based or itinerary-based in-vehicle sensor and trip-related data access rights from an underlying commercial vehicle monitoring system operated by the transportation company.

Yet another aspect of an embodiment of the present invention is providing a novel dataset categorization scheme in the privacy control-adjustable commercial vehicle electronic logging and trip data-sharing system to create multiple-tier data access privileges that categorizes a "must-disclose" mandatory dataset and multiple tiers of privacy-adjustable datasets customized for industry-specific needs of third-party corporate partners in various industries, such as logistics brokers, retailers, product distributors, construction equipment companies, vehicle insurance companies, vehicle maintenance shops, safety consultants, and regulatory agencies.

Furthermore, another aspect of an embodiment of the present invention is providing one or more flexible user interfaces that enable a transportation company operator or a commercial vehicle driver to grant or deny requests by third-party corporate partners to access privacy-adjustable datasets accumulated by the transportation company operator.

In addition, another aspect of an embodiment of the present invention is providing a method of operating a novel privacy control-adjustable commercial vehicle electronic logging and trip data-sharing system with a novel wild card mode that grants a vehicle monitoring personnel or a third-party corporate partner a time-limited and frequency-limited access to currently-private datasets based on an explicit pre-arranged agreement with a commercial vehicle driver.

FIG. 1 shows a system component diagram (100) for a privacy control-adjustable commercial vehicle electronic logging device (ELD) and trip data-sharing system between a transportation company and a third-party corporate partner entity, named herein as the "TripShare" system, in accordance with an embodiment of the invention. As shown in the system component diagram (100), the commercial fleet TripShare system (101) comprises an in-vehicle engine control unit (ECU)-connected sensor and GPS location tracking unit (103), driver hour-of-service (HoS) time card and behavior analytics unit (105), a transported asset condition and tracking unit (107), a dashboard visual recording and analytics unit (109), work form and media file digitalization unit (111), and a variety of industry-specific SaaS-based client application software (113, 115, 117, 119) that enable third-party corporate partners to access real-time commercial vehicle fleet data on a case-by-case basis per vehicle trip, or on a time-limited basis via electronic authorizations provided by a vehicle monitoring personnel from the commercial vehicle fleet company.

Preferably, the commercial fleet TripShare system (101) is designed to operate in a plurality of commercial vehicles owned by a particular trucking company or another transportation company, with selective Internet-of-Things (IoT) data share authorization capabilities with third-party corporate partners of the transportation company. Examples of third-party corporate partners include, but are not limited to, logistics brokers, retailers, or product distributors (121), construction equipment or mining equipment companies (123), vehicle insurance companies or vehicle maintenance shops (125), and safety consultants or regulatory agencies (127), as shown in FIG. 1.

In a preferred embodiment of the invention, the in-vehicle engine control unit (ECU)-connected sensor and GPS location tracking unit (103) and the driver hour-of-service (HoS) time card and behavior analytics unit (105) are incorporated into an onboard vehicle monitoring device and/or a vehicle electronic logging device (ELD), which is configured to track and analyze vehicle speed, vehicle operating parameters, vehicle maintenance requirements, fuel consumption, and GPS-based vehicle trip routes. The driver hour-of-service (HoS) time card and behavior analytics unit (105) associated with the vehicle electronic logging device (ELD) is also capable of determining a commercial vehicle driver's regulatory violations for federal, state, or company-mandated vehicle operating rules (e.g. on-duty time limit, mandatory resting periods between on-duty timeframes, speed limit violations, etc.), while providing an electronic user interface to enable the driver to create or modify a commercial driver's electronic vehicle log with the driver hour-of-service (HoS) time card and behavior analytics unit (105) associated with the vehicle electronic logging device (ELD).

Furthermore, the transported asset condition and tracking unit (107) in the commercial fleet TripShare system (101) may incorporate one or more environmental and location tracking sensors inside the commercial vehicle and/or on a shipped package (i.e. the "transported asset") transported by the commercial vehicle to broadcast its GPS-based location, vehicle door lock conditions, and ambient temperatures. For example, a temperature sensor and a cargo door lock status sensor may be installed in a cargo area of a commercial vehicle (e.g. a truck, a van, etc.), while a GPS-based active tag may be attached to the shipped package. In this example, the transported asset condition and tracking unit (107) incorporates the temperature sensor, the cargo door lock sensor, and a wireless tag reader unit that can routinely scan and track the GPS-based active tag attached to the shipped package. In some instances, the transported asset condition and tracking unit (107) is capable of tracking the real-time location of the GPS-based active tag attached to the shipped package nationally or globally, even if the shipped package is no longer contained in the cargo area of a particular commercial vehicle.

Moreover, in the preferred embodiment of the invention, the commercial fleet TripShare system (101) also incorporates a dashboard visual recording and analytics unit (109) per commercial vehicle that can capture visual and aural multimedia information from a commercial vehicle's dashboard camera and a microphone. In some embodiments of the invention, the dashboard visual recording and analytics unit (109) also incorporates a CPU, a memory unit, and a visual and aural pattern recognition and analytical software module configured to determine at least one of dangerous driver behaviors, commercial driver safety or regulatory violations, and precarious environmental conditions associated with road, traffic, or weather conditions. In addition, the commercial fleet TripShare system (101) can also integrate a work form and media file digitalization unit (111) that converts any paper-based vehicle driving records, maintenance logs, driver violation notices issued by law enforcement, or other paper-based information into digitalized electronic records, and subsequently stores such digitalized records in a non-volatile storage device controlled by the commercial fleet TripShare system (101). In some embodiments of the invention, the work form and media file digitalization unit (111) is also configured to store multimedia information captured by the dashboard visual recording and analytics unit (109) and any other video or audio files related to commercial driver behaviors and commercial vehicle safety compliance.

As illustrated by the system component diagram (100) in FIG. 1, the commercial fleet TripShare system (101) implements and deploys a variety of industry-specific SaaS-based client application software (113, 115, 117, 119) that enable third-party corporate partners to access real-time and/or historical commercial vehicle fleet data on a case-by-case basis per vehicle trip, or on a time-limited basis via electronic authorizations provided by a vehicle monitoring personnel from the commercial vehicle fleet company. The industry-specific SaaS-based client application software (113, 115, 117, 119) are configured to be downloaded into and executed on a client-side portable electronic device (e.g. a smart phone, a tablet computer, a notebook computer) or a client-side server connected to a plurality of client-side portable electronic devices. The industry-specific SaaS-based client application software (113, 115, 117, 119) deployed by the commercial fleet TripShare system (101) provides client-side electronic user interfaces for navigating industry-specific authorized access of real-time and/or historical commercial vehicle fleet data from the commercial vehicle fleet company. In the preferred embodiment of the invention, the industry-specific authorized access of real-time and/or historical commercial vehicle fleet data may include at least some of real-time in-vehicle sensor and/or related IoT device parameters (e.g. vehicle speed, fuel efficiency, cargo area ambient temperature, g-forces exerted on transported goods, vehicle or asset location coordinates, etc.), dash camera A/V (audio/video) feeds, and commercial driver and vehicle regulatory compliance and violation electronic log data from a commercial vehicle electronic logging device (ELD) installed in each commercial vehicle operated by the commercial vehicle fleet company.

Examples of the industry-specific SaaS-based client application software (113, 115, 117, 119) implemented and deployed to third-party corporate partners to the commercial vehicle fleet company include, but are not limited to, a transportation logistics and distribution sector-specific client software application (113), a construction equipment sector-specific client software application (115), a field services sector-specific client software application (117), and an oil, gas, and mining sector-specific client software application (119), as shown in FIG. 1.

In the preferred embodiment of the invention, the transportation logistics and distribution sector-specific client software application (113) is downloaded and utilized by the logistics brokers, retailers, or product distributors (121), while the construction equipment sector-specific client software application (115) is downloaded and utilized by the construction equipment or mining equipment companies (123). Furthermore, the field services sector-specific client software application (117) may be downloaded and utilized by the vehicle insurance companies or vehicle maintenance shops (125), while the oil, gas, and mining sector-specific client software application (119) may be downloaded and utilized by the safety consultants or regulatory agencies (127), as illustrated in FIG. 1.

Figure 2:
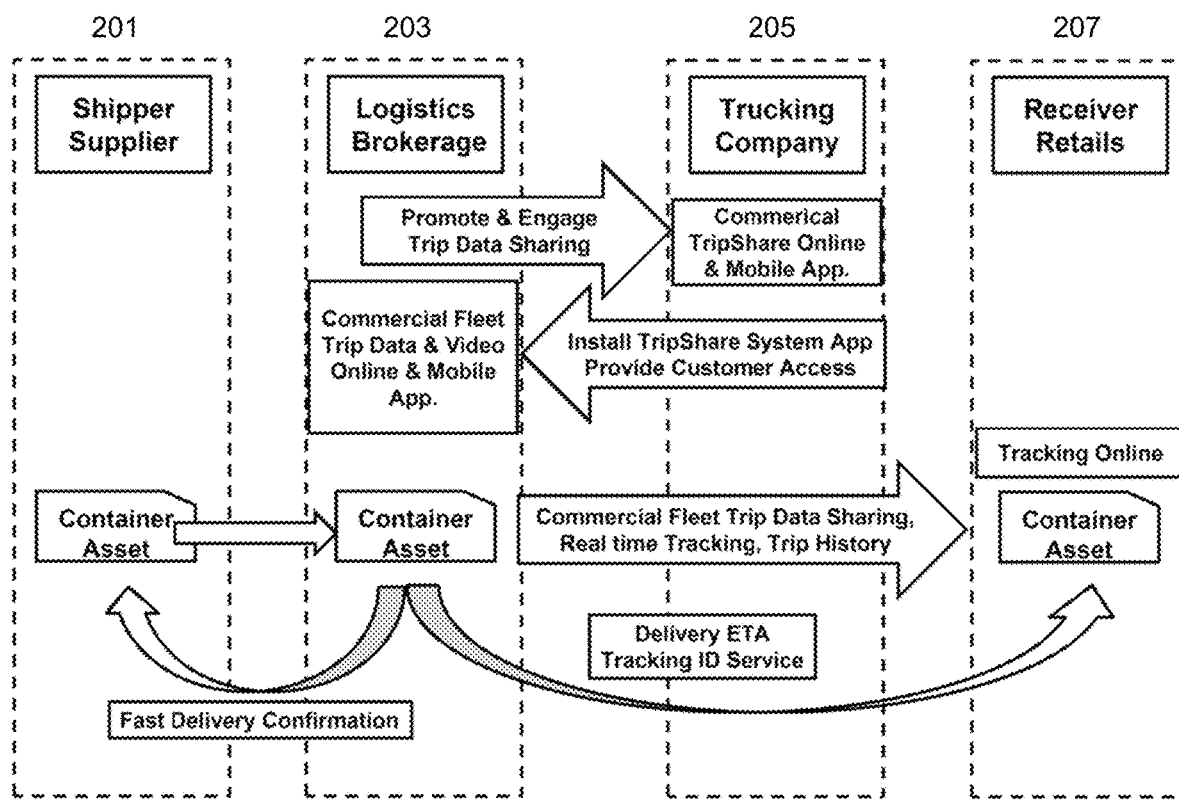
FIG. 2 shows a dataflow diagram for various entities utilizing the privacy control-adjustable commercial vehicle ELD and trip data-sharing system between the transportation company and the third-party corporate partner entity (i.e. the TripShare system), in accordance with an embodiment of the invention.

FIG. 2 shows a dataflow diagram (200) for various entities utilizing the privacy control-adjustable commercial vehicle ELD and trip data-sharing system between the transportation company and the third-party corporate partner entity (i.e. the TripShare system), in accordance with an embodiment of the invention. As illustrated by the dataflow diagram (200), in a preferred embodiment of the invention, the main module responsible for primary control and command of the TripShare system is locally installed onto and executed by a computer server or a cloud-computing infrastructure operated by a trucking company (205) or another transportation company. In other embodiments, this main module of the TripShare system may be operated by a dedicated TripShare service provider entity that treats the trucking company (205) as a cloud network-based client, which is empowered, on a subscription fee bases with a web-based user interface, to create and maintain a full control and access to the primary control and command specific to the trucking company's (205) operations from the TripShare system.

The TripShare system further comprises commercial TripShare online and mobile applications that are configured to be deployed and installed onto an IT system operated by a logistics brokerage (203) or another third-party corporate partner, as shown in FIG. 2. The commercial TripShare online and mobile applications installed in a computer server and/or a plurality of mobile electronic devices operated by the logistics brokerage (203) are further operatively connected to electronic communication tags or sensor devices incorporated by container assets or transported goods currently held by a shipper/supplier (201) or a shipment recipient (207).

Furthermore, in the preferred embodiment of the invention, the TripShare system further comprises in-vehicle ECU-connected sensors, and in-vehicle GPS location sensors, and in-vehicle commercial electronic logging devices (ELD's) per commercial vehicle operated by the trucking company (205) to accumulate, update, and analyze a holistic and comprehensive dataset associated with various stages of transported goods movement and in-vehicle conditions, such as real-time ambient cargo room temperatures, maximum accelerative or decelerative g-forces experienced by the transported goods in the cargo area, transported goods real-time location parameters, speeding or other transport safety violations committed by a truck driver in route to the recipient, delivery estimated time of arrival (ETA), and delivery confirmations. These accumulated, updated, and analyzed datasets associated with various stages of transported goods and in-vehicle conditions may be selectively authorized by the trucking company (205) to be shared with the logistics brokerage (203), the shipper/supplier (201), or the shipment recipient (207) via industry-specific commercial TripShare online and mobile applications deployed and installed onto mobile devices and IT computer server systems separately operated by the logistics brokerage (203), the shipper/supplier (201), or the shipment recipient (207), as shown in the dataflow diagram (200) in FIG. 2.

In the preferred embodiment of the invention, the logistics brokerage (203) may operate as a "middle agent" or a shipment logistics data broker among the trucking company (205), the shipper/supplier (201), and the shipment recipient (207), to provide a layer of privacy-protecting abstraction for the trucking company (205) and professional fee-based asset condition and safety real-time checkup service for its customers (e.g. the shipper/supplier (201), the shipment recipient (207), etc.). As the middle agent, the logistics brokerage (203)'s IT infrastructure is connected to a multiple number of TripShare systems operated by a plurality of trucking companies and/or other transportation companies, and is configured to provide privacy-controlled and selective transported goods/asset data condition checkup and tracking parameters to its customers.

For example, in one embodiment of the invention, the shipper/supplier (201) and the shipment recipient (207) may not be given any trucking companies' privacy-sensitive information or trade secrets, such as specific names of truck drivers, trucking companies' names, commercial ELD-related compliance information, and fuel efficiency information or commercial vehicle fleets, by the logistics brokerage (203). However, the logistics brokerage (203) or the trucking company (207) may utilize the TripShare system that has accumulated a wealth of historical and real-time vehicle fleet and asset tracking and condition checkup parameters to provide such privacy-sensitive information to commercial fleet safety regulators in local, state, or federal agencies, insurance companies, or other authorized third-party corporate partners on a periodic or on-demand basis.

FIG. 3 shows a TripShare system settings menu (300) for privacy-adjustable commercial vehicle operating parameter access authorization to a third-party corporate partner, in accordance with an embodiment of the invention. The TripShare system settings menu (300) is typically displayed on a transportation company's IT operations computer that executes a client main module responsible for primary control and command of the TripShare system by the transportation company (e.g. the trucking company (205) in FIG. 2).

As illustrated in FIG. 3, the TripShare system settings menu (300) allows a transportation company's vehicle fleet monitoring personnel to create a "partner key," which is digitally paired with a corporate partner's user name, email address, and company name. If an authorized corporate partner subsequently enters this partner key, which acts as a unique access authorization code, on the corporate partner-side client user interface generated by a commercial TripShare online and mobile app, then the authorized corporate partner is able to access a transportation company-authorized subset of various real-time and historical commercial fleet vehicle sensor, location tracking, and ELD data output parameters.

In a preferred embodiment of the invention, the TripShare system settings menu (300) empowers the transportation company's vehicle fleet monitoring personnel to specify particular commercial vehicle operating data-sharing boundaries with a particular corporate partner identified by the partner key code. As shown by the TripShare system settings menu (300) in FIG. 3, examples of specifying particular commercial vehicle operating data-sharing boundaries include, but are not limited to, selectively enabling or disabling the particular corporate partner to receive or access streaming real-time readouts from the transportation company's dynamically-generated real-time commercial vehicle engine control unit (ECU) sensors, commercial vehicle location sensors, and/or commercial vehicle electronic logging devices (ELDs) and related regulatory compliance/violation alerts.

The "partner key"-based corporate privacy-adjustable commercial vehicle operating parameter access authorization method embodied in the TripShare system presents a novel commercial fleet data privacy adjustment paradigm for improved corporate partnership synergies with transportation logistics brokers, insurance companies, vehicle maintenance service providers, and commercial vehicle safety regulators, without compromising internal controls related to excessively sensitive information to outside corporate partners. For example, company personnel data belonging to the transportation company for its internal human resource controls and utilizations, such as driver names and biographical information, commercial vehicle sensor and ELD readout information during driver off-duty hours, competitive business intelligence information associated with vehicle routes and fuel mileage per each commercial driver, and/or other trade secrets, may need to be kept private and inaccessible from a particular corporate partner, on a case-by-case basis. The TripShare system empowers the transportation company to initiate and manage desirable corporate data-sharing with third-party corporate partner entities, while tightly controlling corporate data privacy in real time to protect sensitive aspects of commercial vehicle operations metrics on a case-by-case basis.

Figure 4:
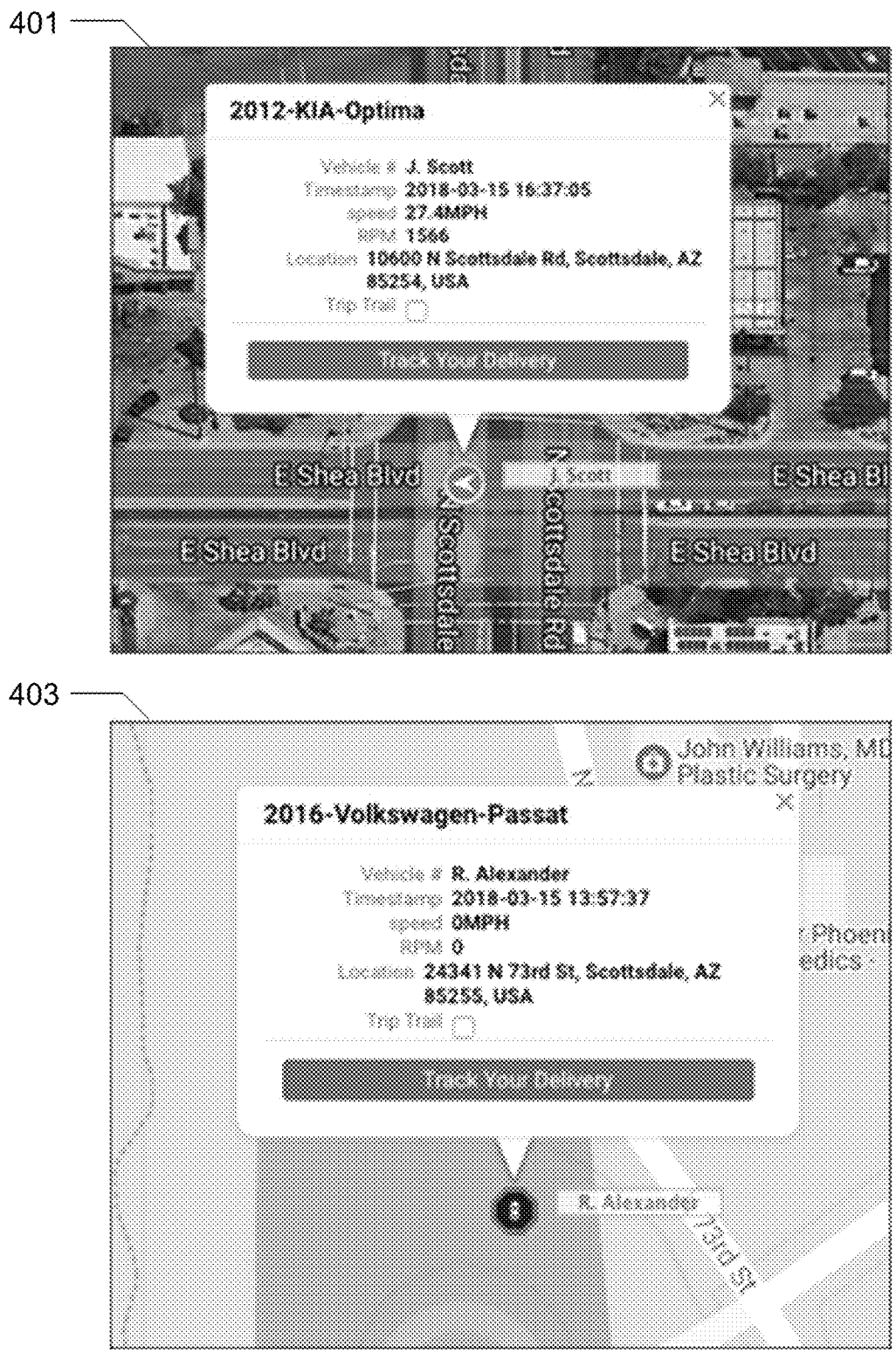
FIG. 4 shows real-time transport vehicle and transported asset tracking interfaces generated by the TripShare system, in accordance with an embodiment of the invention.

FIG. 4 shows real-time transport vehicle and transported asset tracking interfaces (400) generated by the TripShare system, in accordance with an embodiment of the invention. Typically, a third-party corporate partner to a transportation company, with an authorized partner key to access real-time location data streaming from a particular commercial vehicle, executes a commercial TripShare online and mobile app on a client electronic device (e.g. a third-party corporate partner's notebook computer, smart phone, table computer, etc.) to track transported assets and vehicles carrying such transported assets in real time.

As illustrated by the first real-time transport vehicle and transported asset tracking interface (401), the third-party corporate partner to the transportation company is able to track a delivery vehicle in real time (i.e. "2012-KIA-Optima" by J. Scott) on a satellite photographic map, accompanied by a timestamp of the real-time vehicle location, vehicle speed, engine RPM, and any other access-authorized in-vehicle parameters. In some embodiments of the invention, the first real-time transport vehicle and transported asset tracking interface (401), executed by the commercial TripShare online and mobile app on the client electronic device, also allows the third-party corporate partner to track real-time conditions of a transported asset (e.g. ambient cargo temperature, accelerative or decelerative g-forces experienced by the transported asset, package-specific location sensing relative to vehicle location, etc.) inside the delivery vehicle.

Furthermore, as shown by the second real-time transport vehicle and transported asset tracking interface (403), the third-party corporate partner to the transportation company is also able to track another delivery vehicle in real time (i.e. "2016-Volkswagen-Passat" by R. Alexander) on a computer graphics-generated map, accompanied by a timestamp of the real-time vehicle location, vehicle speed, engine RPM, and any other access-authorized in-vehicle data parameters. In some embodiments of the invention, the second real-time transport vehicle and transported asset tracking interface (403), executed by the commercial TripShare online and mobile app on the client electronic device, also allows the third-party corporate partner to track real-time conditions of a transported asset (e.g. ambient cargo temperature, accelerative or decelerative g-forces experienced by the transported asset, package-specific location sensing relative to vehicle location, etc.) inside the delivery vehicle.

Figure 5:
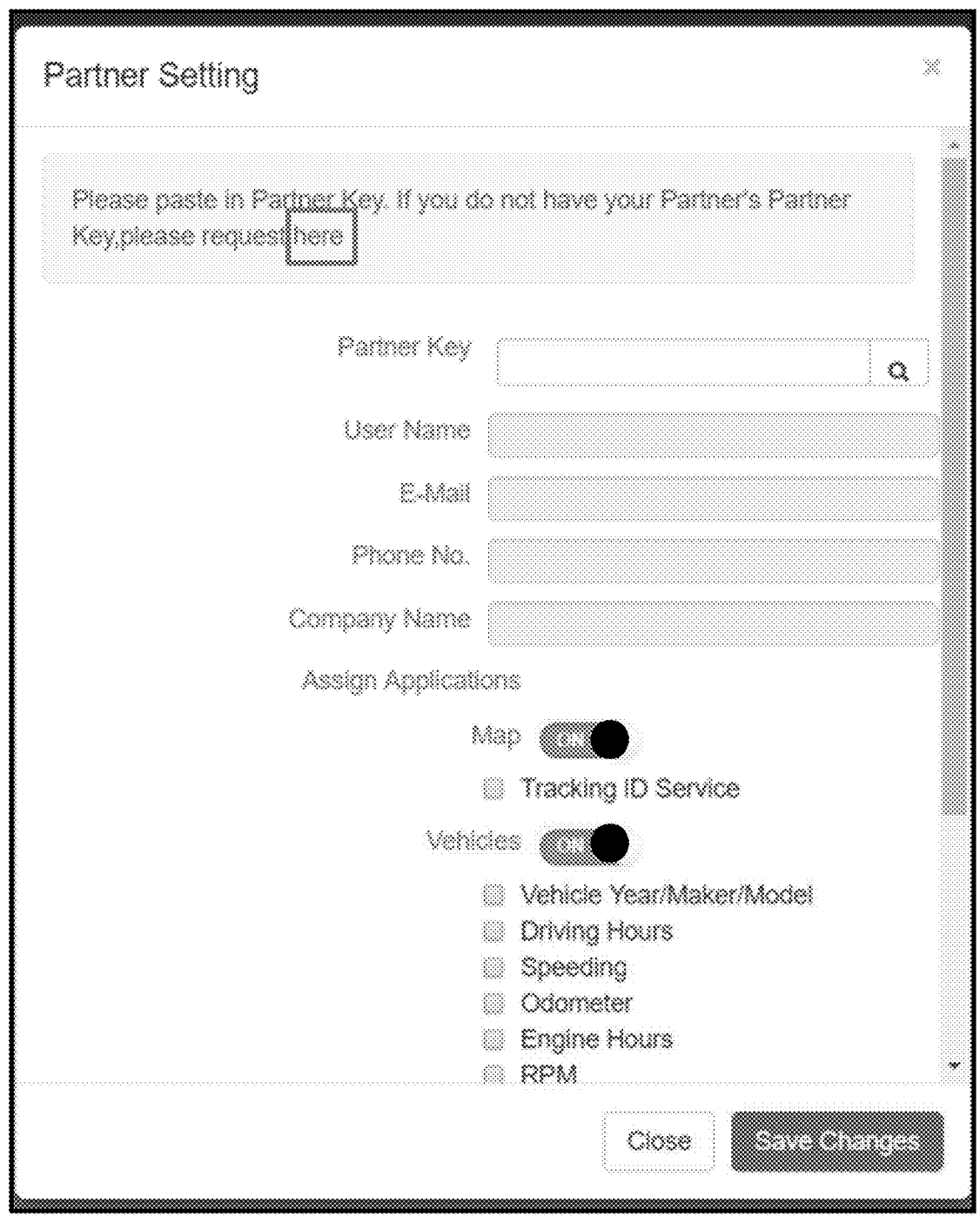
FIG. 5 shows a user interface for assigning a partner key in the TripShare system to authorize a third-party access to a trucking company's privacy-adjustable real-time commercial vehicle operating and/or asset tracking parameters, in accordance with an embodiment of the invention.

FIG. 5 shows a user interface (500) for assigning a partner key in the TripShare system to authorize a third-party access to a transportation company's privacy-adjustable real-time commercial vehicle operating and/or asset tracking parameters, in accordance with an embodiment of the invention. In a preferred embodiment of the invention, the trucking company or another transportation company, which is the primary client or operator of the TripShare system, is able to generate and enter a "partner key" into the TripShare system. The "partner key" is a unique partner identification passcode that an authorized third-party corporate partner can utilize to gain time-limited, trip-by-trip, or case-by-case basis permission to access the transportation company's privacy-adjustable real-time commercial vehicle operating and/or asset tracking parameters, as shown in the user interface (500) in FIG. 5. Partner-related identification information, such as a username, an email address, a phone number, and a partner company name, can also be entered into the TripShare system. Importantly, the transportation company's commercial vehicle fleet monitoring personnel is empowered to have fine granularity of corporate privacy controls in configuring specific in-vehicle ECU-connected sensor, location tracking, and transported asset condition checking sensor parameters to share with the authorized third-party corporate partner on a time-limited, trip-by-trip, or case-by-case basis only, as shown in the user interface (500) in FIG. 5.

FIG. 6 shows a user interface (600) for a third-party entity applying for a partner key in the TripShare system to gain access to a transportation company's privacy-adjustable real-time commercial vehicle operating and/or asset tracking parameters, in accordance with an embodiment of the invention. In a preferred embodiment of the invention, it is up to the transportation company's commercial vehicle fleet monitoring personnel or an intelligent machine determination of the partner access authorization on behalf of the transportation company to grant the third-party entity a time-limited, case-by-case basis, or trip-by-trip basis right to access the transportation company's privacy-adjustable real-time commercial vehicle operating and/or asset tracking parameters upon submission of the partner key application by the aspiring third-party corporate partner entity, as shown in the user interface (600) in FIG. 6.

Figure 7:
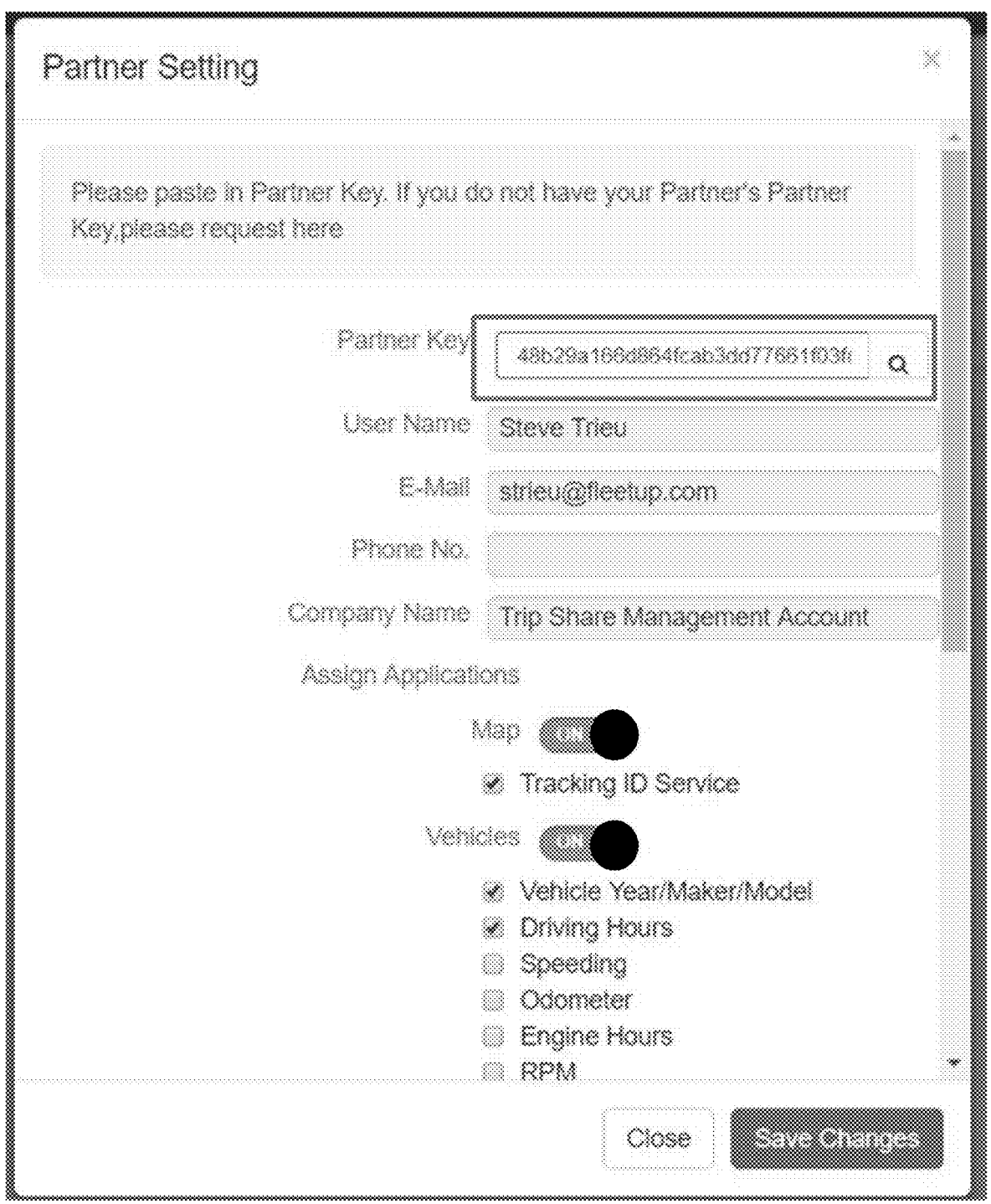
FIG. 7 shows a user interface for authorizing specific privacy-adjustable real-time commercial vehicle operating and/or asset tracking applications to share with an authorized third-party entity, in accordance with an embodiment of the invention.

FIG. 7 shows a user interface (700) for authorizing specific privacy-adjustable real-time commercial vehicle operating and/or asset tracking applications to share with an authorized third-party entity, in accordance with an embodiment of the invention. In this user interface (700) screenshot from the "partner setting" menu, the trucking company or another transportation company, which is the primary client or operator of the TripShare system, enters a "partner key" into the TripShare system. The "partner key" entered herein is the unique partner identification passcode that authorizes a particular third-party corporate partner (e.g. "Steve Trieu" from TripShare Management Account) to gain time-limited, trip-by-trip, or case-by-case basis permission to access the transportation company's privacy-adjustable real-time commercial vehicle operating and/or asset tracking parameters, as shown in the user interface (700) in FIG. 7. Partner-related identification information, such as a username, an email address, a phone number, and a partner company name, can also be entered into the TripShare system. As shown by this example, the transportation company's commercial vehicle fleet monitoring personnel retains fine granularity of corporate privacy controls in configuring specific in-vehicle ECU-connected sensor, location tracking, and transported asset condition checking sensor parameters to share with the authorized third-party corporate partner on a time-limited, trip-by-trip, or case-by-case basis.

FIG. 8 shows a user interface (800) for a third-party corporate partner entity (e.g. a logistics broker) completing its registration in the TripShare system as an authorized commercial fleet vehicle data-sharing partner, in accordance with an embodiment of the invention. In this embodiment, the user interface (800) is configured to list a plurality of third-party corporate partner entities and a plurality of usernames even within one particular third-party corporate partner. As shown in this example, the transportation company's commercial vehicle fleet monitoring personnel is able to register or remove any authorized commercial fleet vehicle data-sharing partners and particular partner usernames at the transportation company's discretion, thus activating or revoking commercial fleet in-vehicle data parameter access privileges for third-party corporate partner entities and related partner usernames.

FIG. 9 shows a user interface (900) authorizing trip data sharing for one particular vehicle only with a third-party corporate partner entity from the transportation company's commercial fleet operation vehicles monitored by the TripShare system, in accordance with an embodiment of the invention. In this example, only one vehicle (i.e. Device ID: test1, License Number: 101) is permitted to share streaming real-time data outputs from in-vehicle sensors and/or transported asset condition-detecting sensors with an authorized third-party corporate partner, while all other vehicles in the commercial fleet vehicle list for the transportation company are not allowed to stream real-time data outputs from their in-vehicle sensors and/or transported asset condition-detecting sensors to the authorized third-party corporate partner, as shown by the user interface (900) in FIG. 9.

FIG. 10 shows a user interface (1000) in the TripShare system revoking data-sharing privilege for a particular vehicle from a third-party corporate partner entity, in accordance with an embodiment of the invention. In this example, when the transportation company's commercial vehicle fleet monitoring personnel invokes the "return arrow" icon under the "Operation" menu for the particular vehicle (i.e. "test1") selected from the user interface (1000), the third-party corporate partner loses the in-vehicle data-sharing privilege for "test1" vehicle, while retaining in-vehicle data-sharing privileges for other previously-authorized vehicles in the shared vehicles list, as shown in FIG. 10.

Figure 11:
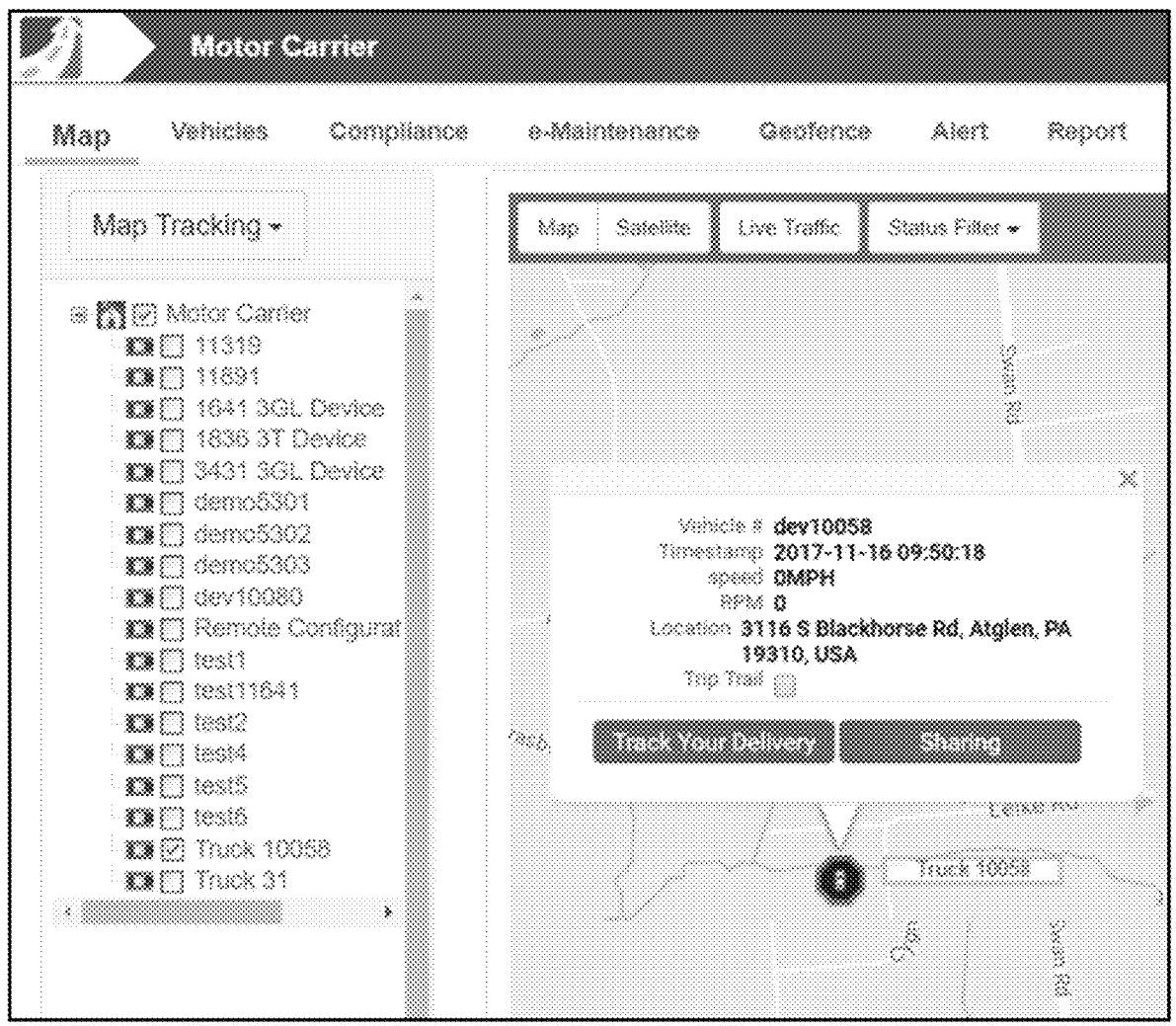
FIG. 11 shows the TripShare system sharing location data of a data share-authorized commercial vehicle with a third-party corporate partner entity, in accordance with an embodiment of the invention.

FIG. 11 shows the TripShare system sharing location data (1100) of a data share-authorized commercial vehicle (i.e. "vehicle #: dev10058) with a third-party corporate partner entity, such as a logistics broker, in accordance with an embodiment of the invention. In this example, "Truck 10058" with the vehicle identification number "dev10058" is tracked in real-time by the third-party corporate partner entity on a computer-generated graphical map interface. Third-party corporate partner access-authorized in-vehicle data parameters, such as a timestamp of the real-time vehicle location, vehicle speed, engine RPM, and other in-vehicle sensor or commercial vehicle ELD-generated streaming data outputs, may also be selectively shared with the third-party corporate partner, if the transportation company's commercial vehicle fleet monitoring personnel specifically authorized trip data and/or transported asset data sharing with the third-party corporate partner from the TripShare system's master user interface operated by the transportation company.

In some embodiments of the invention, the third-party corporate partner is also authorized to track real-time conditions of a transported asset (e.g. ambient cargo temperature, accelerative or decelerative g-forces experienced by the transported asset, package-specific location sensing relative to vehicle location, etc.) inside the data share-authorized commercial vehicle (i.e. "vehicle #: dev10058).

Figure 12:
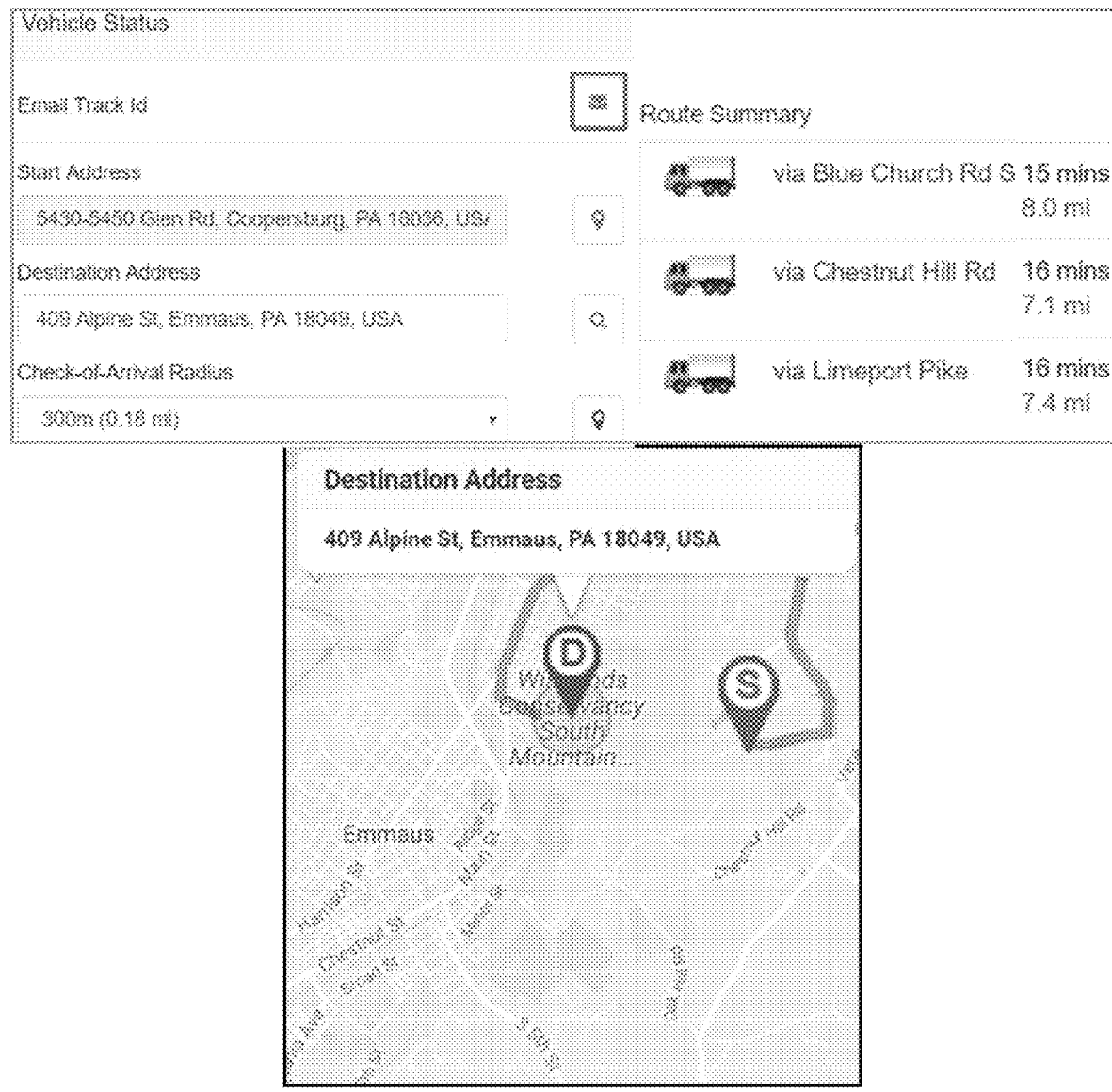
FIG. 12 shows the TripShare system sharing real-time trip data of a data share-authorized commercial vehicle by destination, in accordance with an embodiment of the invention.

FIG. 12 shows the TripShare system sharing real-time trip data (1200) of a data share-authorized commercial vehicle by destination, in accordance with an embodiment of the invention. In this example, the third-party corporate partner entity, which is authorized to share the real-time trip data (1200) of a data share-authorized commercial vehicle, receives a live streaming broadcast of the real-time trip data (1200) that includes a turn-by-turn route summary, a real-time journey status on a computer-generated map, a current street location of the vehicle, a destination address, and a check-of-arrival radius indicator, as shown in FIG. 12.

Furthermore, if the transportation company's commercial vehicle fleet monitoring personnel specifically authorized trip data and/or transported asset data sharing with the third-party corporate partner from the TripShare system, the third-party corporate partner can also receive live streaming outputs from ECU and/or ELD-connected in-vehicle sensors and devices, such as vehicle speeds relative to specific areas, g-forces experienced in the cargo area, engine RPMs, regulatory violation information, vehicle malfunction or maintenance requirement indications, and commercial driver ELD login or logout information for the data share-authorized commercial vehicle. In addition, the third-party corporate partner may also be selectively authorized to track real-time conditions of a transported asset (e.g. ambient cargo temperature, accelerative or decelerative g-forces experienced by the transported asset, package-specific location sensing relative to vehicle location, etc.) inside the data share-authorized commercial vehicle, if the transportation company wants to share such additional live streaming information originating from the transported asset itself within the data share-authorized commercial vehicle.

FIG. 13 shows a user interface screenshot (1300) from the TripShare system enabling turn-by-turn map-based real-time shipment item tracking originating from a data share-authorized commercial vehicle via a track ID registration with a third-party corporate partner entity, in accordance with an embodiment of the invention. In this example, the transportation company's commercial vehicle fleet monitoring personnel registers the track identification (ID) for the data share-authorized commercial vehicle that will broadcast turn-by-turn map-based real-time shipment item tracking from in-vehicle ECU-connected sensors, GPS location beacons, and/or shipment-embedded package condition sensors to the third-party corporate partner entity for a particular trip on a shared time-limited basis.

As shown in FIG. 13, the third-party corporate partner entity is only authorized to access the broadcasted output parameters from the in-vehicle ECU-connected sensors, the GPS location beacons, and/or the shipment-embedded package condition sensors from the sharing start time to the sharing end time. Alternatively, the trip data sharing may be limited to the duration of a particular trip and automatically end upon reaching the destination address. In addition, as shown in the user interface screenshot (1300), the transportation company's commercial vehicle fleet monitoring personnel is able to send a personalized note to the third-party corporate partner entity to explain specific conditions and/or durations of the trip data sharing, which are tightly controlled and managed by the transportation company for corporate and/or driver privacy protection.

FIG. 14 shows an example (1400) of "tiered" (e.g. gold, diamond) TripShare information accessibility from a data share-authorized commercial vehicle to a logistics broker or another client, in accordance with an embodiment of the invention. As shown by the tiered TripShare access privilege levels in the example (1400), a non-gold and non-diamond tier third party corporate partner to the transportation company may be engaged in a "regular-tier" TripShare mode allowing streaming access to shared vehicle directory by expiration time, vehicle year/make/model, trip history with replay video, fuel consumption, sorting by company, engine hours, various ECU-connected sensor readings, driver email information, and hour-of-service (HoS) log information, as shown in the example (1400) in FIG. 14.

In contrast, a gold-tier third party corporate partner may be engaged in a "gold-tier" TripShare mode, which additionally allows access to more detailed or private information, such as 10-second-refresh GPS tracking on a computerized map with live traffic overlay, on-duty driving hours, vehicle fuel mileage, last known location, real-time vehicle odometer readouts, driver name, driver phone number, and any driver behavioral-related alerts (e.g. speeding events and location on a map, traffic law violations, etc.) or delivery vehicle functionality-related alerts (e.g. engine over-revving events and location on the map, engine temperature, etc.), as shown in the example (1400) in FIG. 14. Furthermore, a diamond-tier third party corporate partner may be engaged in a "diamond-tier" TripShare mode, which provides all access privileges of gold-tier and regular-tier partners and add access privileges to even more sensitive, private, and/or detailed information streaming from the delivery vehicle, such as tracking ID service for transported assets, historical trip data other than the current delivery trip information, and driver hour-of-service (HoS) ELD login and status information, as shown in the example (1400) in FIG. 14.

In a preferred embodiment of the invention, the higher access privilege tier may be determined by the transportation company's level of trust for a particular corporate partner in accessing and analyzing potentially sensitive (i.e. non-public) information that may include competitive intelligence-worthy trade secrets or private information, such as employees' biographical information, driver behavioral tendencies, driver traffic/regulatory violation statuses, typical fuel mileage of one or more delivery vehicles in the transportation company's commercial fleet, typical time elapsed for delivering a particular package to a specific destination, and vehicle age and maintenance conditions. Alternatively, the access privilege tier may be determined by any specific amount of subscription fees paid by the third-party corporate partners to the transportation company. For example, a corporate partner (i.e. a logistics broker) that pays the highest subscription fee may be entitled to the "diamond-tier" streaming data readout from one or more data share-authorized commercial vehicles, while another corporate partner (i.e. a vehicle wash and cleaning service partner) that has relatively minor needs for streaming data readout from the commercial vehicle fleet may only pay a basic subscription fee to access the limited set of regular-tier streaming data from the commercial vehicle fleet.

On a related note, FIG. 21 shows an example (2100) of industry and partner-specific commercial vehicle data access desirability from a TripShare system-equipped trucking company, in accordance with an embodiment of the invention. As shown by this example (2100), industry and partner-specific commercial vehicle data desirability among various fields of services (e.g. broker/logistics, maintenance service center, insurance, construction customers, retail/distribution customer, etc.) can vary greatly from one industry to another. The TripShare system is designed to satisfy this unique challenge in the commercial fleet data analytics industry by catering to various industry and partner-specific commercial vehicle data access needs, while empowering the transportation company to retain a fine granular control of corporate and employee data privacy that may otherwise be accidentally violated or breached by disclosing too much information to outside corporate partner entities.

Figure 15:
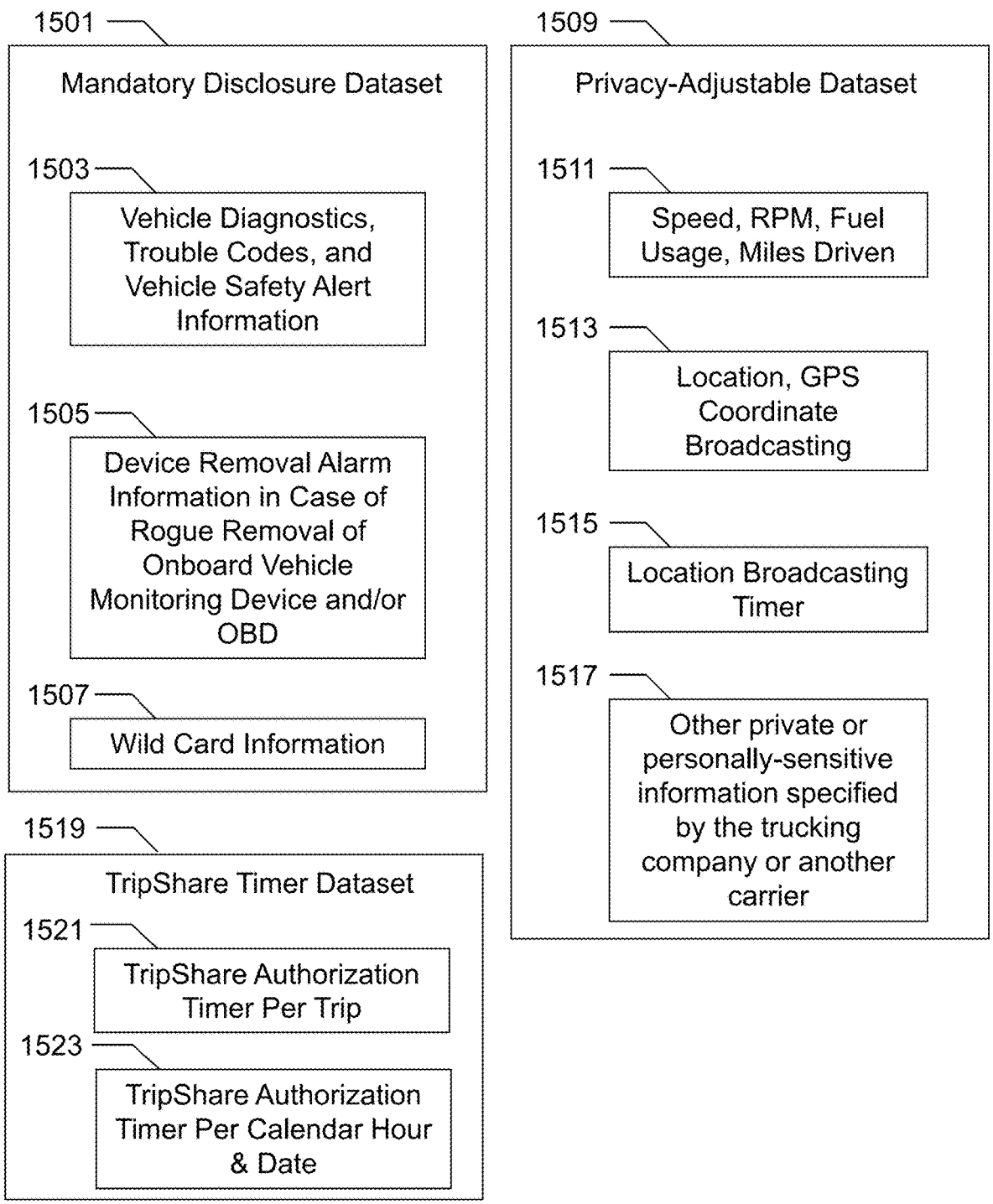
FIG. 15 shows mandatory disclosure and privacy-adjustable dataset separations in the TripShare system utilized by a trucking company, a logistical brokerage, and/or another transport client entity, in accordance with an embodiment of the invention.

FIG. 15 shows a novel separation (1500) of a mandatory disclosure dataset (1501) and a privacy-adjustable dataset (1509) in a privacy control-adjustable commercial vehicle electronic logging device (ELD) and trip data-sharing system (i.e. the TripShare system) between a transportation company and a third-party corporate partner entity, in accordance with an embodiment of the invention. In a preferred embodiment of the invention, the mandatory disclosure dataset (1501) and the privacy-adjustable dataset (1509) are both part of a vehicle information dataset, which is collected and stored by a privacy control-adjustable onboard vehicle monitoring device in a vehicle and also by a cloud-networked server executing the TripShare system.

In case of the mandatory disclosure dataset (1501), all data fields within the mandatory disclosure dataset (1501) is periodically and wirelessly transmitted from the privacy control-adjustable onboard vehicle monitoring device to the cloud-networked server executing the TripShare system. Typically, the TripShare system is controlled and monitored by a vehicle monitoring personnel who is responsible for operating the TripShare system on behalf of the transportation company As shown in FIG. 15, in the preferred embodiment of the invention, the mandatory disclosure dataset (1501) comprises a first sub-dataset comprising vehicle diagnostics, trouble codes, and vehicle safety alert information (1503), a second sub-dataset comprising device removal alarm information in case of rouge removal of an onboard vehicle monitoring device and/or an onboard device (OBD) (1505), and optionally, a third sub-dataset comprising wild card information (1507). For example, in context of the preferred embodiment of the invention, transmission of data related to an engine malfunction trouble code, a brake failure warning alert, or a crash detection alert from the onboard vehicle monitoring device and/or the OBD to the computer server operated by the vehicle monitoring personnel is mandatory. A driver in a vehicle equipped with the privacy control-adjustable onboard vehicle monitoring device cannot disable or turn off the automated and periodic transmission of sub-datasets (e.g. 1503, 1505, 1507) in the mandatory disclosure dataset, because the information contained in the mandatory disclosure dataset is deemed too critical not to be disclosed to the vehicle monitoring personnel at all times. In another embodiment of the invention, the mandatory disclosure dataset (1501) may include other data or exclude one or more of the sub-datasets (1503, 1505, 1507) listed in the preferred embodiment of the invention, depending on particular needs of vehicle monitoring.

Continuing with FIG. 15, the privacy-adjustable dataset (1509) is also part of the vehicle information dataset. In the preferred embodiment of the invention, the privacy-adjustable dataset (1509) is a collection of sub-datasets, such as a first sub-dataset comprising speed, engine rotations per minute (RPM), fuel usage, miles driven (1511), a second sub-dataset comprising location and GPS coordinate broadcasting (1513), a third sub-dataset comprising a location broadcasting timer (1515), and a fourth sub-dataset comprising other private or personally-sensitive information (1517) specified by the driver. Examples of other private or personally-sensitive information (1517) include, but are not limited to, video information recorded from a dashboard-mounted camera, audio information recorded from a microphone in the vehicle, music preferences and listening history from the vehicle's audio system, and Internet search history using an onboard Internet user interface. Unlike the mandatory disclosure dataset (1501), the privacy-adjustable dataset (1509) may stay private within the vehicle and remain inaccessible to the cloud-networked server operated by the transportation company's vehicle monitoring personnel or to the transportation company's authorized third-party corporate partner entity, unless the driver grants access to the vehicle monitoring personnel. In some instances, the transportation company's vehicle monitoring personnel may be responsible for making privacy adjustment decisions for vehicle-broadcasted streaming TripShare data outputs, instead of the vehicle driver, to ensure protection of corporate privacy and trade secrets against undesirable competitive intelligence leak risks posed by certain third-party corporate partner entities that may accidentally or intentionally access and/or leak sensitive corporate trade secrets via the TripShare system.

This novel aspect of the present invention is particularly useful if the driver or the transportation company's vehicle monitoring personnel believes that certain types of information collected and stored by the privacy control-adjustable onboard vehicle monitoring device is too personal and private to qualify as a mandatory disclosure to the third-party corporate partner entities in real time. For example, the driver or the transportation company's vehicle monitoring personnel may find that the vehicle's particular speed (i.e. 111), the journey history in form of location and GPS coordinate broadcasting (i.e. 113), or a visual feed recorded by a dashboard mounted camera (i.e. 117), is too personal and private to disclose to any third-party corporate partner entities. Therefore, in one or more embodiments of the invention, these sub-datasets (1511, 1513, 1515, 1517) are contained in the privacy-adjustable dataset, wherein each sub-dataset and any data field within each sub-dataset can be individually flagged as "private" (i.e. not accessible by all or a subset of third-party corporate partner entities) or "monitoring allowed" (i.e. available for remote vehicle data sharing to outside corporate entities).

Furthermore, in one embodiment of the invention, a particular time slot for the location and GPS coordinate broadcasting (1513) may be configured using the location broadcasting timer (1515). The location broadcasting timer (1515) is particularly useful if the driver is driving a company vehicle or a commercial vehicle, in which his or her employer requires disclosure of the vehicle location during business hours. The location broadcasting timer (1515) can enable the location and GPS coordinate broadcasting to the driver's supervising entity only during the pre-selected hours (e.g. 8 am~6 pm, Monday~Friday), so that the location and GPS coordinate broadcasting (1513) is only active during those pre-selected hours, while automatically being disabled during the non pre-selected hours, such as weekends or off-days.

In the preferred embodiment of the invention, the wild card information (1507) includes an electronic consent between the driver and the vehicle monitoring personnel regarding the number and the frequency of allowed wild card mode usages per specific time period. A "wild card mode," in context of various embodiments of the present invention, is a unique and consensual driver privacy setting-override mode that enables the cloud-networked server operated by the vehicle monitoring personnel to check all of the vehicle information dataset, including both the mandatory disclosure dataset (1501) and the privacy-adjustable dataset (1509). For example, if the driver consented to allowing two "wild card modes" per month, with each wild card mode lasting up to ten minutes for data access to the privacy-adjustable dataset (1509) stored in the privacy control-adjustable onboard vehicle monitoring device, then the cloud-networked server operated by the vehicle monitoring personnel is authorized to access the privacy-adjustable dataset (1509) on a real-time basis or on a periodic download basis, up to twice a month and only for ten minutes per wild card mode operation. Furthermore, the driver or another trip data share authorizer will be alerted that the wild card mode is activated via a driver's or another trip data share authorizer's user interface device (e.g. an onboard vehicle user interface, a mobile electronic device, a notebook computer), if the vehicle monitoring personnel activates the wild card mode. Preferably, the wild card mode-related alerts can be transmitted and received in form of mobile application-based alerts, vehicle device alerts, emails, or text messages, which are presented by the driver's or another trip data share authorizer's user interface device.

The wild card mode in accordance with various embodiments of the invention is devised as a balanced compromise between a driver's desire for some privacy and a vehicle monitoring personnel's need for a robust analysis and monitoring of vehicles for safety, business efficiency, legal compliance, and in-vehicle trip data sharing with authorized third-party corporate partner entities. The terms of the wild card mode, such as the number of allowed wild card accesses per month and the duration of each wild card mode-based access, can be dynamically adjusted between the driver and the vehicle monitoring personnel by adjusting the wild card information (1507) based on the electronic consent between the driver and the vehicle monitoring personnel.

Furthermore, a TripShare authorization timer (1519) comprising a TripShare authorization timer per trip (1521) and a TripShare authorization timer per calendar hour and date (1523) may also be a component of the novel data structures for the privacy control-adjustable commercial vehicle electronic logging device (ELD) and trip data-sharing system (i.e. the TripShare system), as shown in FIG. 15. The TripShare authorization timer (1519) determines and enforces the duration of in-vehicle sensor, location, and ELD status-related data sharing with an authorized third-party corporate partner entity by the transportation company. Typically, the transportation company's vehicle monitoring personnel limits the third-party corporate partner entity's authorized in-vehicle data access to a particular trip that carries a specific package of the third-party corporate partner entity's interest. In this case, after the particular trip is completed, the TripShare system may automatically revoke or cancel third-party corporate partner entity's access to the transportation company's internal TripShare-related databases and in-vehicle data parameter broadcasts at the expiration of the time set by the TripShare authorization timer per trip (1521). Alternatively, the TripShare authorization timer per calendar hour and date (1523) can limit the third-party corporate partner entity's access to the transportation company's internal TripShare-related databases and in-vehicle data parameter broadcasts to a specific calendar hour and date, thus allowing the third-party corporate partner to access multiple trip-worth information up to the time of TripShare system access rights expiration at the specific calendar hour and date.

Figure 16:
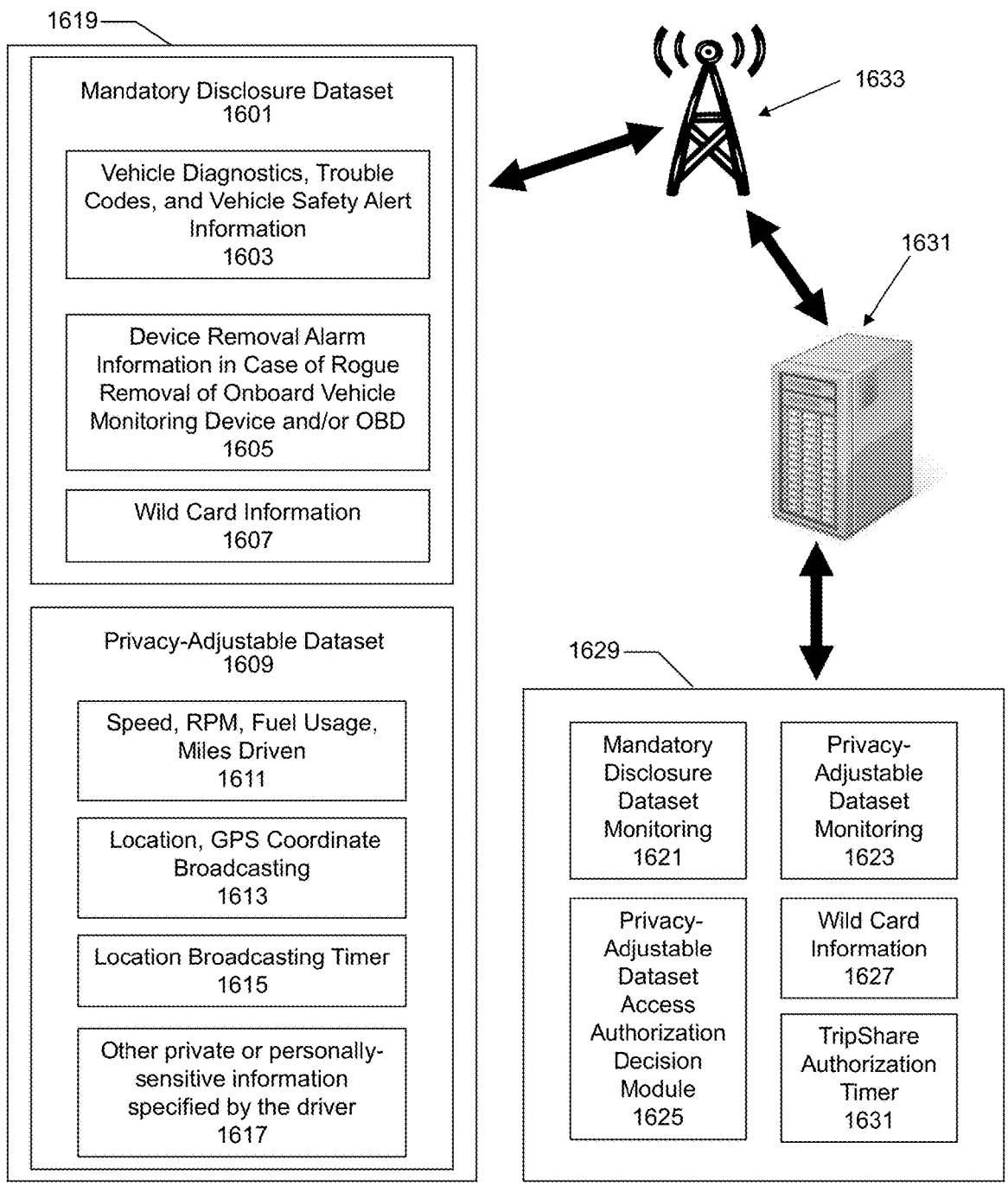
FIG. 16 shows a system block diagram of the TripShare system utilized by a trucking company, a logistical brokerage, and/or another transport client entity, in accordance with an embodiment of the invention.

FIG. 16 shows a dataflow block diagram (1600) of a mandatory disclosure dataset (1601) and a privacy-adjustable dataset (1609) collected in an onboard vehicle monitoring device to a vehicle monitoring station's computer server (1631) in a TripShare system, which is operated by a transportation company's vehicle monitoring personnel, in accordance with an embodiment of the invention. In a preferred embodiment of the invention, the mandatory disclosure dataset (1601) and the privacy-adjustable dataset (1609) are part of the vehicle information dataset (1619), which is collected and stored by a privacy control-adjustable onboard vehicle monitoring device in a vehicle.

In case of the mandatory disclosure dataset (1601), all data fields within the mandatory disclosure dataset (1601) are periodically and wirelessly transmitted from the privacy control-adjustable onboard vehicle monitoring device to a computer server (1631) operated by a vehicle monitoring personnel. As shown in FIG. 16, in the preferred embodiment of the invention, the mandatory disclosure dataset (1601) comprises a first sub-dataset comprising vehicle diagnostics, trouble codes, and vehicle safety alert information (1603), a second sub-dataset comprising device removal alarm information in case of rouge removal of an onboard vehicle monitoring device and/or an onboard device (OBD) (1605), and a third sub-dataset comprising wild card information (1607). For example, in context of this embodiment of the invention, transmission of data related to an engine malfunction trouble code, a brake failure warning alert, or a crash detection alert from the onboard vehicle monitoring device and/or the OBD to the computer server (1631) operated by the vehicle monitoring personnel is mandatory. A driver in a vehicle equipped with the privacy control-adjustable onboard vehicle monitoring device cannot disable or turn off the automated and periodic transmission of sub-datasets (e.g. 1603, 1605, 1607) in the mandatory disclosure dataset, because the information contained in the mandatory disclosure dataset is deemed too critical not to be disclosed to the vehicle monitoring personnel at all times. In another embodiment of the invention, the mandatory disclosure dataset (1601) may include other data or exclude one or more of the sub-datasets (1603, 1605, 1607) listed in the preferred embodiment of the invention, depending on particular needs of vehicle monitoring.

Continuing with FIG. 16, the privacy-adjustable dataset (1609) is also part of the vehicle information dataset (1619), and is periodically or continuously collected, stored, and/or recorded by the privacy control-adjustable onboard vehicle monitoring device. In the preferred embodiment of the invention, the privacy-adjustable dataset (1609) is a collection of sub-datasets, such as a first sub-dataset comprising speed, engine rotations per minute (RPM), fuel usage, miles driven (1611), a second sub-dataset comprising location and GPS coordinate broadcasting (1613), a third sub-dataset comprising a location broadcasting timer (1615), and a fourth sub-dataset comprising other private or personally-sensitive information (1617) specified by the driver. Examples of other private or personally-sensitive information (1617) include, but are not limited to, video information recorded from a dashboard-mounted camera, audio information recorded from a microphone in the vehicle, music preferences and listening history from the vehicle's audio system, and Internet search history using an onboard Internet user interface. Unlike the mandatory disclosure dataset (1601), the privacy-adjustable dataset (1609) is generally not disclosed to or accessible by the computer server (1631) operated by the vehicle monitoring personnel, unless the driver grants access to the vehicle monitoring personnel. In some instances, the transportation company's vehicle monitoring personnel may be responsible for making privacy adjustment decisions for vehicle-broadcasted streaming TripShare data outputs, instead of the vehicle driver, to ensure protection of corporate privacy and trade secrets against undesirable competitive intelligence leak risks posed by certain third-party corporate partner entities that may accidentally or intentionally access and/or leak sensitive corporate trade secrets via the TripShare system.

This novel aspect of the present invention is particularly useful if the driver or the transportation company's vehicle monitoring personnel believes that certain types of information collected and stored by the privacy control-adjustable onboard vehicle monitoring device are too personal and private to qualify as a mandatory disclosure to the third-party corporate partner entities in real time. For example, the driver or the transportation company's vehicle monitoring personnel may find that the vehicle's particular speed (i.e. 1611), the journey history in form of location and GPS coordinate broadcasting (i.e. 1613), or a visual feed recorded by a dashboard mounted camera (i.e. 1617), is too personal and private to disclose to any third-party corporate partner entities. Therefore, in one or more embodiments of the invention, these sub-datasets (1611, 1613, 1615, 1617) are contained in the privacy-adjustable dataset (1609), wherein each sub-dataset and any data field within each sub-dataset can be individually flagged as "private" (i.e. not accessible by all or a subset of third-party corporate partner entities) or "monitoring allowed" (i.e. available for remote vehicle data sharing to outside corporate entities).

Furthermore, in one embodiment of the invention, a particular time slot for the location and GPS coordinate broadcasting (1613) may be configured using the location broadcasting timer (1615). The location broadcasting timer (1615) is particularly useful if the driver is driving a company vehicle or a commercial vehicle, in which his or her employer requires disclosure of the vehicle location during business hours. The location broadcasting timer (1615) can enable the location and GPS coordinate broadcasting to the driver's supervising entity only during the pre-selected hours (e.g. 8 am~6 pm, Monday~Friday), so that the location and GPS coordinate broadcasting (1613) is only active during those pre-selected hours, while automatically being disabled during the non pre-selected hours, such as weekends or off-days.

In the preferred embodiment of the invention, the wild card information (1607) categorized within the mandatory disclosure dataset (1601) includes an electronic consent between the driver and the vehicle monitoring personnel regarding the number and the frequency of allowed wild card mode usages per specific time period. A "wild card mode," in context of various embodiments of the present invention, is a unique and consensual driver privacy setting-override mode that enables the computer server (1631) operated by the vehicle monitoring personnel to check all of the vehicle information dataset, including both the mandatory disclosure dataset (1601) and the privacy-adjustable dataset (1609). For example, if the driver consented to allowing four "wild card modes" per month, with each wild card mode lasting up to five minutes for data access to the privacy-adjustable dataset (1609) stored in the privacy control-adjustable onboard vehicle monitoring device, then the computer server (1631) operated by the vehicle monitoring personnel is authorized to access the privacy-adjustable dataset (1609) on a real-time basis or on a periodic download basis, up to four times a month and only for five minutes per wild card mode operation. Furthermore, the driver will be alerted that the wild card mode is activated via a driver's or another trip data share authorizer's user interface device (e.g. an onboard vehicle user interface, a mobile electronic device, a notebook computer), if the vehicle monitoring personnel activates the wild card mode. Preferably, the wild card mode-related alerts can be transmitted and received in form of mobile application-based alerts, vehicle device alerts, emails, or text messages, which are presented by the driver's or another trip data share authorizer's user interface device.

The wild card mode in accordance with various embodiments of the invention is devised as a balanced compromise between a driver's desire for some privacy and a vehicle monitoring personnel's need for a robust analysis and monitoring of vehicles for safety, business efficiency, and legal compliance. The terms of the wild card mode, such as the number of allowed wild card accesses per month and the duration of each wild card mode-based access, can be dynamically adjusted between the driver and the vehicle monitoring personnel by adjusting the wild card information (1607) based on the electronic consent between the driver and the vehicle monitoring personnel.

Continuing with FIG. 16, in the preferred embodiment of the invention, the dataflow (1600) of the vehicle information dataset (1619) stored in the privacy control-adjustable onboard vehicle monitoring device is transmitted to the computer server (1631) executing the TripShare system by a wireless data network (1633). Examples of the wireless data network (1633), which may be utilized for the purpose of transmitting the vehicle information dataset (1619) may include, but are not limited to, a cellular communication network, a satellite communication network, a wireless local area network (LAN), or a combination thereof.

Furthermore, as shown in FIG. 16, the computer server (1631) of the vehicle monitoring personnel executes a TripShare system control module (1629) in its CPU and its memory unit. In the preferred embodiment of the invention, the TripShare system control module (1629) comprises a mandatory disclosure dataset monitoring sub-module (1621), a privacy-adjustable dataset monitoring sub-module (1623), a privacy-adjustable dataset access authorization decision sub-module (1625), a wild card information sub-module (1627), and a TripShare authorization timer sub-module (1631).

The mandatory disclosure dataset monitoring sub-module (1621) is generally capable of analyzing a variety of data fields and sub-datasets associated with the mandatory disclosure dataset (1601) transmitted from each monitored vehicle for the purpose of deducing useful alerts or useful information. For example, the mandatory disclosure data set monitoring module (1621) can monitor a vehicle's engine temperature in real time remotely, and generate a safety alert to the vehicle monitoring personnel if an engine overheat condition is detected. The vehicle monitoring personnel then may call or message the driver or another responsible party to rectify the safety-related situation as efficiently as possible.

Furthermore, the privacy-adjustable dataset monitoring sub-module (1623) is generally capable of analyzing a variety of data fields and sub-datasets associated with the privacy-adjustable dataset (1609) to deduce useful alerts or useful information, but only if the driver allowed access to the privacy-adjustable dataset (1609) locally stored in the privacy control-adjustable onboard vehicle monitoring device. If the driver has not granted access to a particular sub-dataset in the privacy-adjustable dataset (1609), the privacy-adjustable dataset monitoring sub-module (1623) is unable to retrieve data from the particular sub-dataset, but may be able to retrieve data from other sub-datasets of the privacy-adjustable datasets (1609), if the privacy flag setting allows access. For example, the driver may allow access to the location and GPS coordinate broadcasting (1613), but deny access to the speed, RPM, fuel usage, and miles driven (1611) in the privacy-adjustable dataset (1609). In another embodiment of the invention, the vehicle monitoring personnel may access both of the mandatory disclosure dataset (1619) and the privacy-adjustable dataset (1609) at all times, with a corporate policy enabling him or her to do so, but may instead enforce similar privacy-adjustable protection measures against third-party corporate partner entities that are authorized to access at least a subset of the broadcasted in-vehicle data parameters from the vehicle.

In the preferred embodiment of the invention, by using the privacy-adjustable dataset access authorization decision module sub-module (1625), the vehicle monitoring personnel or the third-party corporate partner entity is able to send a permission request to the transportation company's designated data share authorizer (e.g. a management-level transportation company employee, a current driver of the vehicle, etc.) for an authorization (i.e. in form of a response signal) to access private data fields or private sub-datasets within the privacy-adjustable dataset (1609). In one embodiment of the invention, this permission request is sent electronically via the wireless data network (1633). Upon receiving the permission request in the designated data share authorizer's user interface device, the designated data share authorizer may grant or deny the permission request to allow or prevent access to the private data fields and private sub-datasets within the privacy-adjustable dataset (1609) by sending a response signal to the computer server (1631) operated by the vehicle monitoring personnel.

In one example, if the response signal grants the access to the private data field, then the computer server (1631) changes a data access flag for the private data field to "monitoring allowed," and initiates data access to the private data field. If the response signal denies the access to the private data field, then the computer server (1631) is unable to access the private data field from the privacy-adjustable dataset (1609) stored in the privacy-control adjustable onboard vehicle monitoring device.

However, if a wild card mode is activated by the vehicle monitoring personnel's computer server (1631) in accordance with the electronic consent with the driver or another data share authorizer and in accordance with the wild card information (1607, 1627) that specifies the number of allowed wild card modes and the duration of each wild card mode per time interval (e.g. weekly, monthly, yearly, and etc.), then all of the vehicle information dataset (1619) may be temporarily available for analysis by the TripShare system control module (1629). In general, the wild card mode may be activated in case of emergency or in case of a dire need to access vehicle-related information for safety, legal compliance, or business operational efficiencies. Preferably, the driver's or another trip data share authorizer's user interface device informs the driver in real time that the wild card mode is currently active as a privacy alert, if the vehicle monitoring personnel activates the wild card mode.

Furthermore, as also shown in FIG. 16, the TripShare system control module (1629) also includes a TripShare authorization timer (1631) that determines and enforces the duration of in-vehicle sensor, location, and ELD status-related data sharing with an authorized third-party corporate partner entity by the transportation company. In one embodiment of the invention, the transportation company's vehicle monitoring personnel limits the third-party corporate partner entity's authorized in-vehicle data access to a particular trip that carries a specific package of the third-party corporate partner entity's interest. In this case, after the particular trip is completed, the TripShare system may automatically revoke or cancel third-party corporate partner entity's access to the transportation company's internal TripShare-related databases and in-vehicle data parameter broadcasts at the expiration of the time set by the TripShare authorization timer (1631) per trip. Alternatively, the TripShare authorization timer (1631) per calendar hour and date can limit the third-party corporate partner entity's access to the transportation company's internal TripShare-related databases and in-vehicle data parameter broadcasts to a specific calendar hour and date, thus allowing the third-party corporate partner to access multiple trip-worth information up to the time of TripShare system access rights expiration at the specific calendar hour and date.

Figure 17:
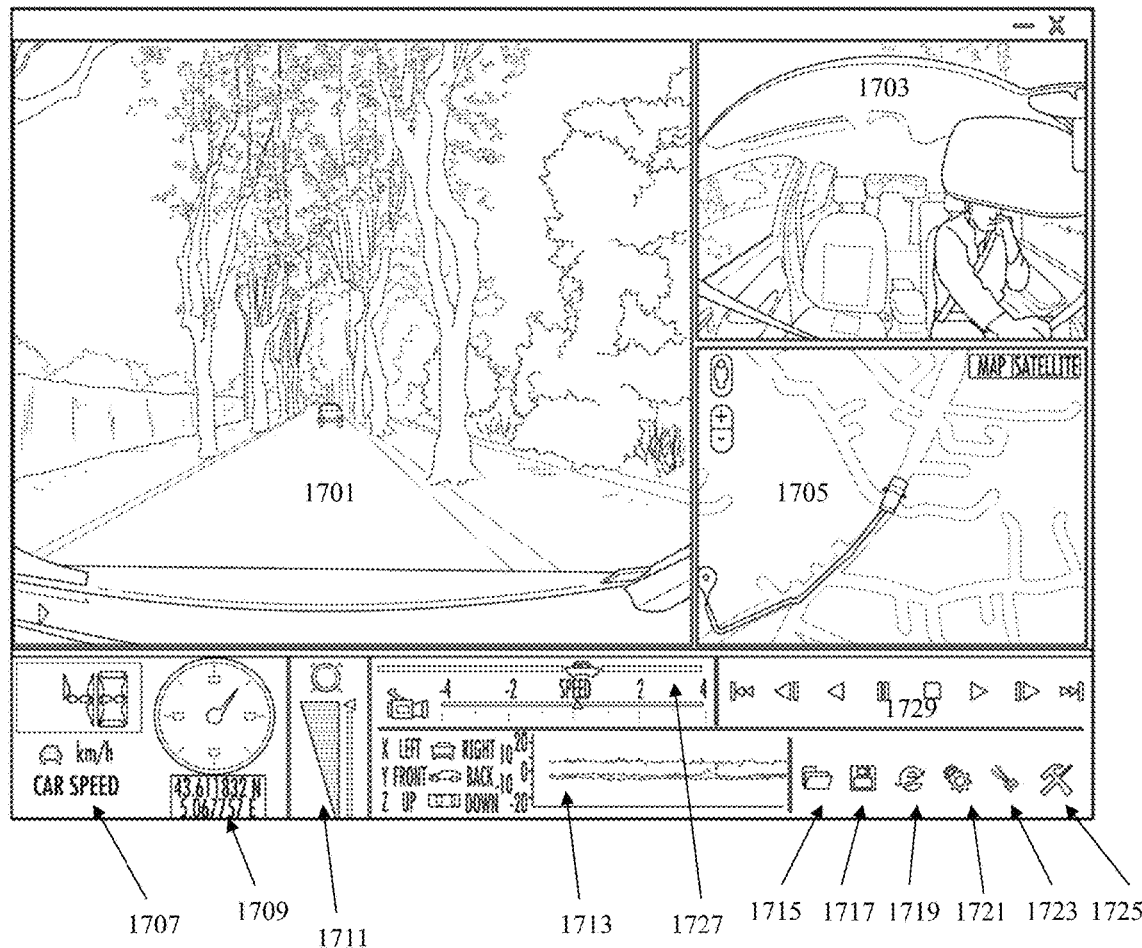
FIG. 17 shows real-time transport vehicle parameters synthesized by a privacy control-adjustable onboard vehicle monitoring device, wherein the parameters are dynamically sharable with a logistics brokerage upon authorization by the TripShare system, in accordance with an embodiment of the invention.

FIG. 17 shows real-time transport vehicle parameters synthesized by a privacy control-adjustable onboard vehicle monitoring device, wherein the real-time transport vehicle parameters are dynamically sharable with a logistics brokerage or another corporate partner entity of the transportation company upon authorization by the TripShare system, in accordance with an embodiment of the invention. As illustrated in FIG. 17, the user interface screenshot (1700) may be utilized by a driver, a vehicle monitoring personnel operating a computer server, or an authorized third-party partner entity connected via the TripShare system, in accordance with an embodiment of the invention. In one embodiment of the invention, the user interface screenshot (1700) is a snapshot of a display screen from a driver's or another trip data share authorizer's user interface device or a vehicle monitoring personnel's display screen connected to a computer server. The display screen of the driver's user interface device or the vehicle monitoring personnel's display screen may be a touch screen display or a non-touch screen display. Furthermore, in one embodiment of the invention, the driver's user interface device may require entry of a password or a personal identification number (PIN) for granting or denying access to a privacy-adjustable dataset access request by the computer server operated by the vehicle monitoring personnel.

A variety of vehicle-related information can be collected, recorded, and stored in a local storage of a privacy control-adjustable onboard vehicle monitoring device, and then selectively and wirelessly transmitted to a computer server executing the TripShare system, which is operated by the vehicle monitoring personnel. As explained previously in association with FIG. 15 and FIG. 16, the variety of vehicle-related information may be categorized as a "vehicle information dataset," which comprises a "mandatory disclosure dataset" and a "privacy-adjustable dataset."

As shown in FIG. 17, in one embodiment of the invention, the driver's user interface device and/or the vehicle monitoring personnel's computer server can record and display a front windshield view (1701) from a front windshield camera, a vehicle cabin view (1703) from a cabin camera, and a GPS and map view (1705) associated with GPS coordinates and underlying map data. Furthermore, the driver's user interface device and/or the vehicle monitoring personnel's computer server can also record and display sensory information such as a speedometer (1707), compass coordinates (1709), and an accelerometer reading (1713). In a preferred embodiment of the invention, the speedometer (1707) may derive its speed information based on changes of GPS coordinates relative to time that are derived from the GPS receiver chipset, or simply read a speedometer output from a vehicle's onboard electronic device. The compass coordinates (1709) may also be derived from the GPS coordinates from the GPS receiver chipset, or be simply recorded from the vehicle's onboard electronic device.

Furthermore, in the embodiment of the invention as shown in FIG. 17, a three-axis accelerometer sensor may be embedded in a vehicle to generate three-axis (i.e. X, Y, Z) accelerometer readings for the vehicle, as displayed by the accelerometer reading display (1713). In a preferred embodiment of the invention, the three-axis accelerometer sensor is a micro electromechanical system (MEMS) device that measures the vehicle's "g-force" or acceleration in various directions during driving. In one embodiment of the invention, the driver's user interface device and/or the vehicle monitoring personnel's computer server can record and display various sensor-based readings, such as speed, compass coordinates, and accelerometer values, in addition to the visual and/or the auditory recordings associated with the front windshield view (1701) and the vehicle cabin view (1703). Furthermore, GPS coordinates for a current location of the vehicle can be displayed in association with an underlying map data, as shown in the GPS and map view using a vehicle monitoring application program (e.g. 1629 of FIG. 16) executed in the driver's user interface device or the computer server operated by the vehicle monitoring personnel.

Furthermore, as shown by FIG. 17, in one embodiment of the invention, the driver's user interface device and/or the vehicle monitoring personnel's computer server can also display an audio speaker volume control (1711), and also replay the stored information using a playback interface (1729) and a playback speed control (1727). In the particular screenshot (1700) as shown in FIG. 17, an "open folder" button (1715), a "save file" button (1717), "a web browser access" button (1719), a "settings control" button (1721), an "information cut" button (1723), and a "close application" button (1725) are also provided by the driver's user interface or the vehicle monitoring personnel's user interface to access, store, and control the recorded information, which originates from the privacy control adjustable onboard vehicle monitoring device installed in the vehicle.

Figure 18:
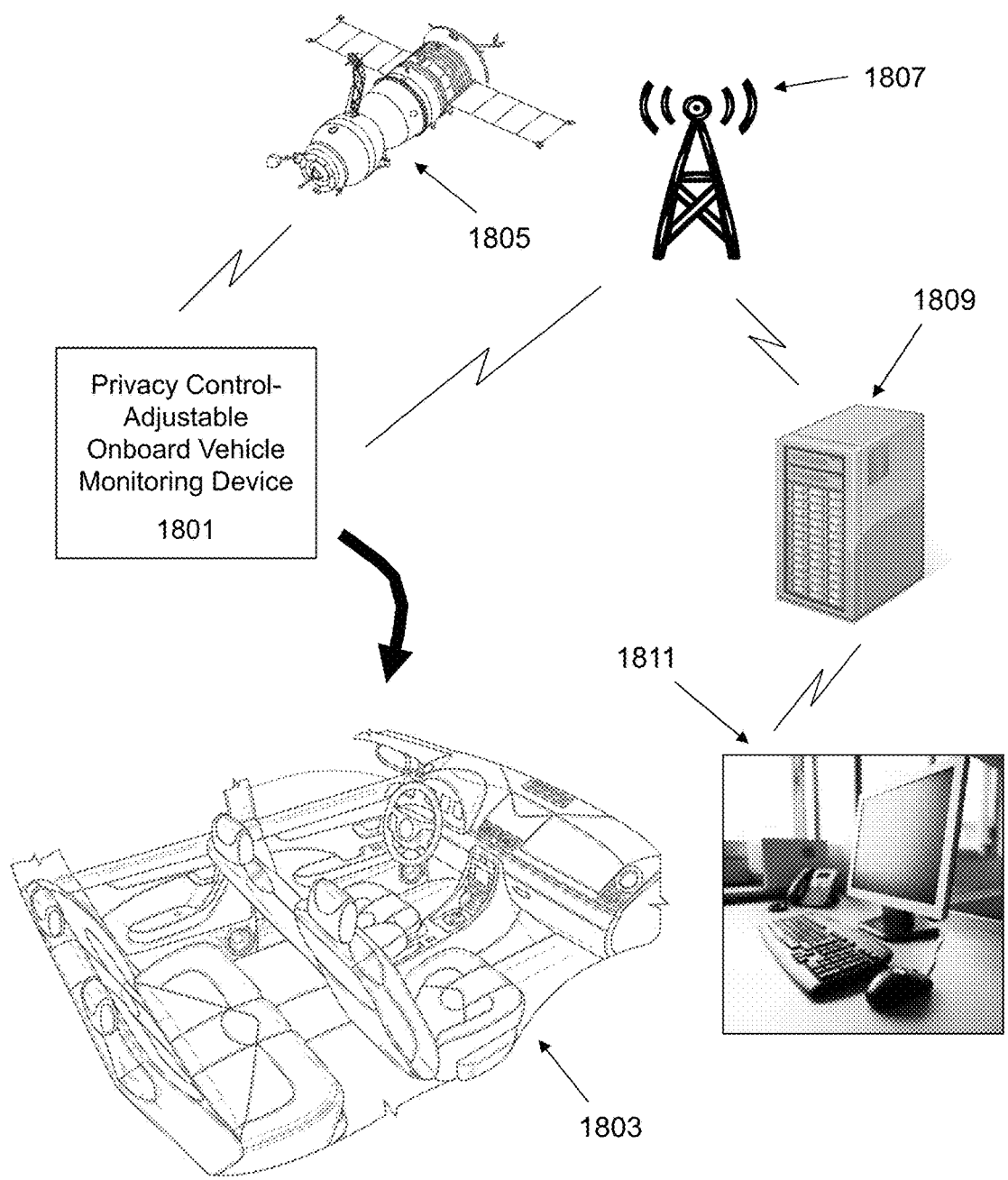
FIG. 18 shows privacy control-adjustable commercial vehicle monitoring components for the TripShare system, in accordance with an embodiment of the invention.

FIG. 18 shows privacy control-adjustable commercial vehicle monitoring components (1800) for the TripShare system, in accordance with an embodiment of the invention. In a preferred embodiment of the invention, the privacy control-adjustable commercial vehicle monitoring components (1800) include a privacy control-adjustable onboard vehicle monitoring device (1801) installed in a vehicle (1803), a vehicle information dataset comprising a mandatory disclosure dataset and a privacy-adjustable dataset that are recorded by the privacy control-adjustable onboard vehicle monitoring device (1801), a wireless transceiver unit either integrated into or operatively connected to the privacy control-adjustable onboard vehicle monitoring device (1801), a wireless data communication network (1807), a computer server (1809) executing at least some portions of the TripShare system, which is operated by a vehicle monitoring personnel, a vehicle monitoring software module (e.g. 1629 of FIG. 16) executed on the computer server (1809), and a vehicle monitoring personnel's user interface device (1811).

In addition, in one embodiment of the invention, the privacy control-adjustable vehicle monitoring system may also include a satellite communication network (1805), as shown in FIG. 18. Furthermore, the privacy control-adjustable vehicle monitoring system may also include a driver's user interface device, such as an onboard vehicle user interface device or a mobile electronic device, which is configured to receive, grant, or deny a privacy-adjustable data access request by the computer server (1809) operated by the vehicle monitoring personnel.

In the preferred embodiment of the invention, the privacy control-adjustable onboard vehicle monitoring device (1801) is capable of storing the vehicle information dataset collected from a vehicle's onboard computer or another vehicle-attached equipment. Furthermore, the wireless transceiver unit either integrated into or operatively connected to the privacy control-adjustable onboard vehicle monitoring device (1801) is capable of transmitting at least a portion of the vehicle information dataset from the privacy control-adjustable onboard vehicle monitoring device (1801) to the computer server (1809) operated by the vehicle monitoring personnel. In addition, in one embodiment of the invention, the vehicle monitoring software module (e.g. 1629 of FIG. 16) is a TripShare software component executed on a CPU and a memory unit of the computer server (1809), and includes a mandatory disclosure dataset monitoring sub-module, a privacy-adjustable dataset monitoring sub-module, a privacy-adjustable dataset access request sub-module, a TripShare authorization timer sub-module, and a wild card information sub-module, as previously described in association with FIG. 16.

Figure 19:
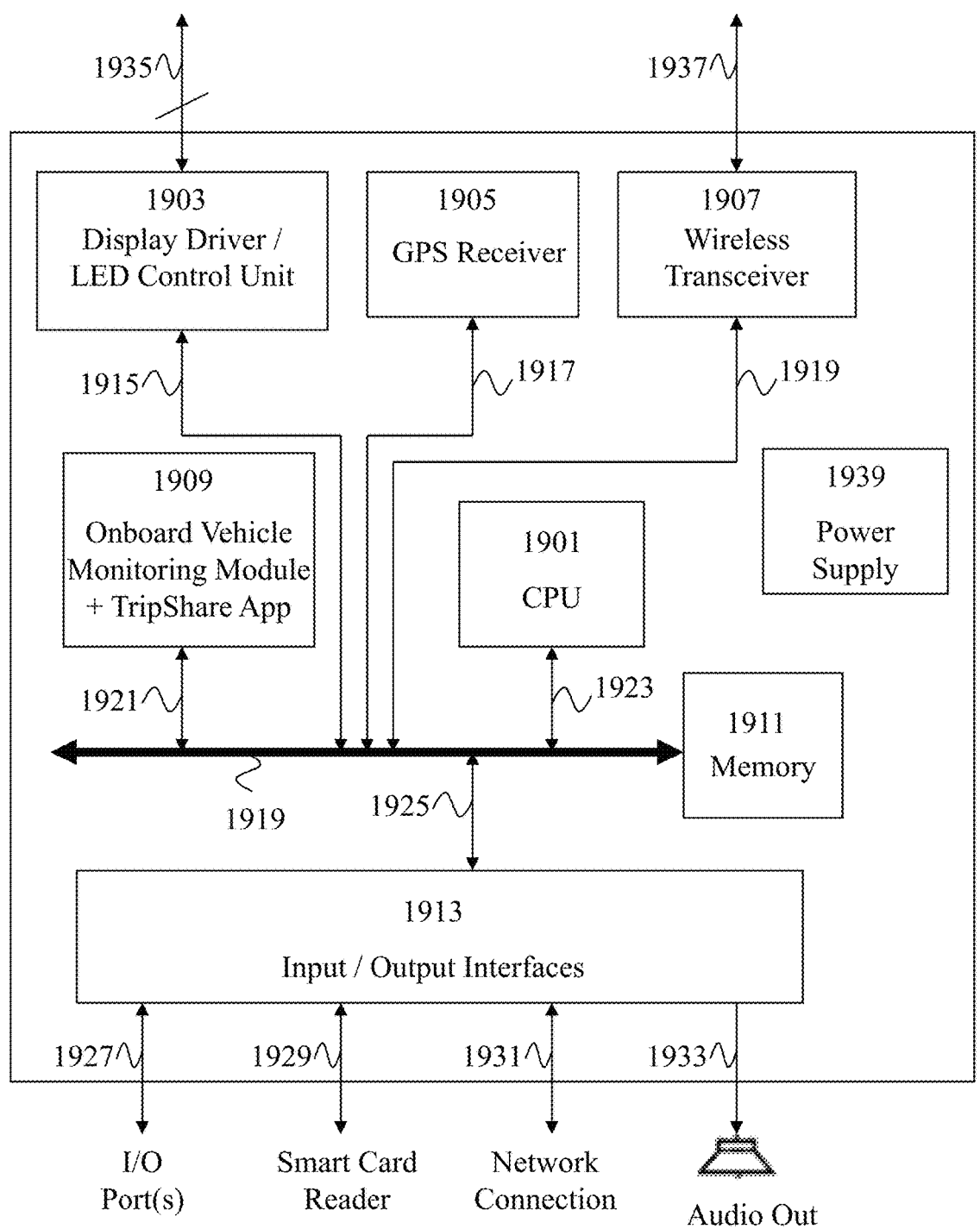
FIG. 19 shows a block diagram example for a privacy control-adjustable onboard vehicle monitoring device executing a TripShare app, in accordance with an embodiment of the invention.

FIG. 19 shows a device block diagram example (1900) for a privacy control-adjustable onboard vehicle monitoring device executing a TripShare app and an onboard vehicle monitoring module, in accordance with an embodiment of the invention. In one embodiment of the invention, the privacy control-adjustable onboard vehicle monitoring device comprises a central processing unit (CPU) (1901), a memory unit (1911), the onboard vehicle monitoring module and the TripShare app (1909), a display driver and light indicator control unit (1903), a GPS receiver unit (1905), and a wireless transceiver unit (1907). In this embodiment of the invention, the CPU (1901) is operatively connected (i.e. 1923) to other functional logic blocks (e.g. 1903, 1905, 1907, 1909, 1911, 1913, etc.) via a data communication bus (1919), and controls behaviors and actions of other functional logic blocks.

Furthermore, in this embodiment of the invention, the memory unit (1911) is a dynamic random access memory (DRAM) unit, a non-volatile memory unit such as a Flash memory unit, or a combination of both, wherein the memory unit (1911) is configured to load data and instructions from the onboard vehicle monitoring module and the TripShare app (1909) and/or a general data storage unit into the CPU (1901) to generate a TripShare electronic user interface and/or an onboard vehicle monitoring user interface for a commercial vehicle driver, a vehicle monitoring personnel, or an outside corporate partner entity. The onboard vehicle monitoring module and the TripShare app (1909) may be stored in a hard disk drive, a non-volatile memory unit such as a Flash memory unit, or another data storage device operatively connected (i.e. 1921) to other functional logic blocks via the data communication bus (1919). In one embodiment of the invention, the onboard vehicle monitoring module and the TripShare app (1909) is configured to retain its stored data integrity even when the electrical power is no longer supplied to the privacy control-adjustable onboard vehicle monitoring device.

Moreover, in the embodiment of the invention with the device block diagram example (1900) for the privacy control-adjustable onboard vehicle monitoring device as shown in FIG. 19, the display driver and light indicator control unit (1903) is configured to drive a display screen (e.g. an LCD screen, one or more LED indicators, and etc.) operatively connected (i.e. 1935) to the device block diagram (1900). In general, driving the display screen involves providing and refreshing display-related data to the display screen. The display driver and light indicator control unit (1903) is operatively connected (i.e. 1915) to the data communication bus (1919), and this unit's actions and behaviors can be ultimately controlled by the CPU (1901).

Continuing with FIG. 19, in one embodiment of the invention, the GPS receiver (1905) is configured to receive GPS location signals and at least partially demodulate or process the received GPS location signals for use by other functional logic blocks in the device block diagram example (1900). Any GPS location information derived from the received GPS location signals may be used for location and GPS coordinate broadcasting and other features incorporated in the privacy control-adjustable onboard vehicle monitoring device. In one embodiment of the invention, the GPS receiver (1905) is operatively connected (i.e. 1917) to the CPU (1901) via the data communication bus (1919).

Furthermore, in one embodiment of the invention, a wireless transceiver (1907) is configured to transmit wireless signals to a wireless router and/or a base station. The wireless transceiver (1907) is also configured to receive wireless signals from the wireless router and/or the base station. The wireless transceiver (1907) is operatively connected (i.e. 1919) to the CPU (1901) via the data communication bus (1919), wherein the CPU (1901) controls and instructs the wireless transceiver (1907) for transmission and reception of wireless signals. In one embodiment of the invention, the wireless transceiver (1907) may also utilize a separate digital signal processing (DSP) unit which processes data packets for wireless transmission or reception according to a particular wireless protocol. In the preferred embodiment of the invention, the wireless transceiver (1907) is designed for cellular network data transmission and reception. In another embodiment of the invention, the wireless transceiver (1907) may also be designed for wireless local area networks (wireless LAN's), mobile broadband signals (e.g. WiMAX), personal area networks (e.g. NFC, Bluetooth), cellular signals, or a combination thereof. In the preferred embodiment of the invention, the wireless transceiver (1907) is operatively connected to an RF antenna via an electrical connection (i.e. 1937).

Moreover, in one embodiment of the invention, the device block diagram example (1900) for the privacy control-adjustable onboard vehicle monitoring device also includes input/output (I/O) interfaces (1913), which is operatively connected (i.e. 1925) to the CPU (1901) and other functional logic blocks of the device block diagram example (1900) via the data communication bus (1919). In one embodiment of the invention, the I/O interfaces (1913) provide data, power, and/or other connections (i.e. 1927, 1929, 1931, 1933) to an I/O port (1927), a smart card reader (1929), a network connection interface (1931), and an audio output port (1933). In particular, the I/O interface (1913) is preferably compatible to automotive diagnostic communication protocols, such as "SAE J1850 PWM," "SAE J1850 VPW," "ISO 9141-2," "ISO 14230-4," "ISO 15765-4," "J1939," and "J1708," most of which may be based on the "OBDII" protocol standard. In a preferred embodiment of the invention, many of the OBDII-based outputs from vehicle diagnostic modules or chips may be part of a mandatory disclosure dataset (e.g. 1501 and 1503 of FIG. 15). For example, many of the vehicle diagnostics, trouble codes, and vehicle safety alert information (e.g. 1503 of FIG. 15) may originate from the OBDII-based outputs from the vehicle diagnostic modules or chips, which are operatively connected to the I/O interfaces (1913) of the privacy control-adjustable onboard vehicle monitoring device.

Furthermore, a power supply unit (1939) is operatively connected to the CPU (1901) and other functional logic blocks of the device block diagram example (1900) for the privacy control-adjustable onboard vehicle monitoring device, wherein the power supply unit (1939) receives electrical power from a battery or another electrical power source, and provides electrical power to the CPU (1901) and other functional logic blocks in the privacy control-adjustable onboard vehicle monitoring device.

Figure 20:
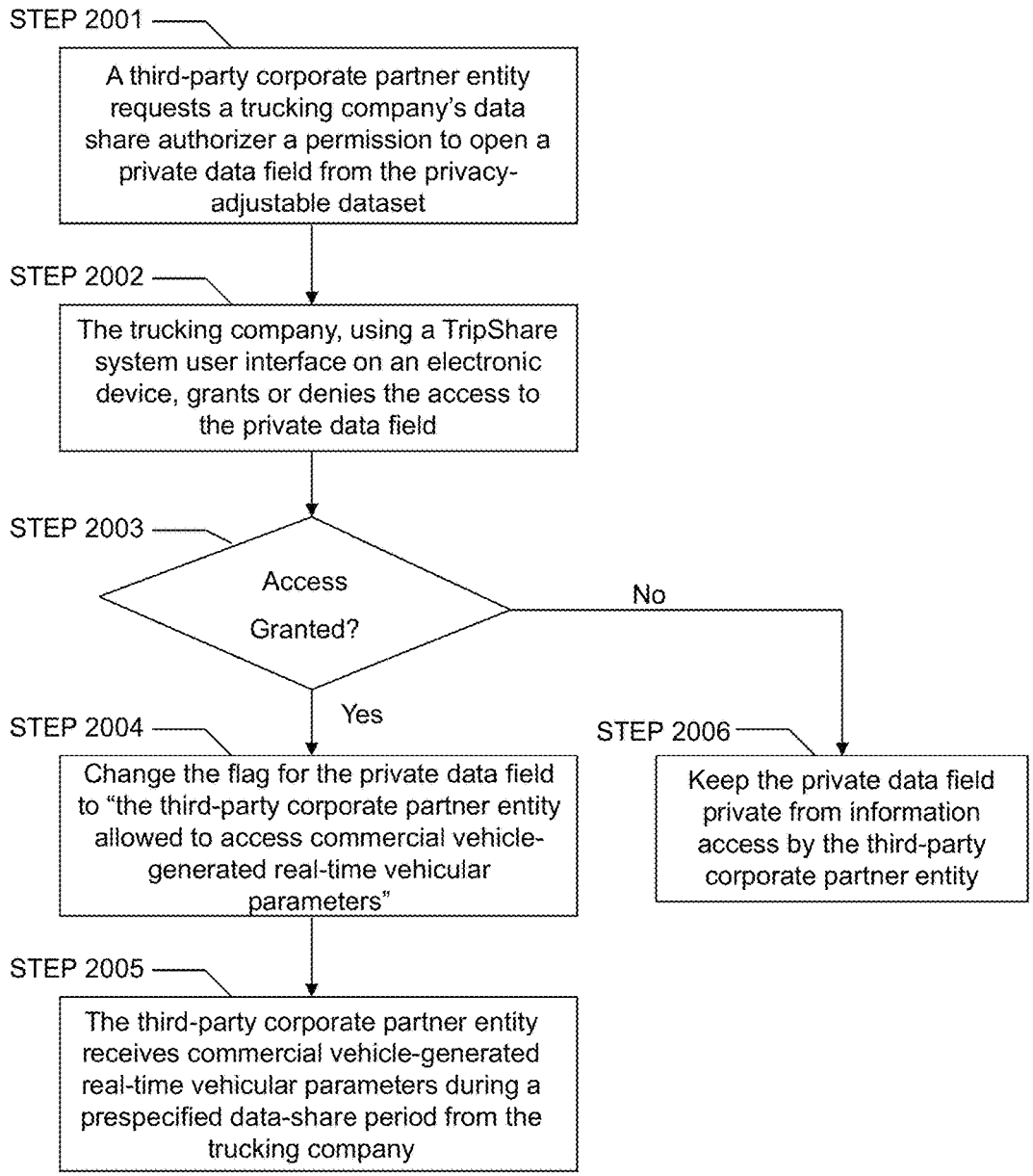
FIG. 20 shows a method of privacy control-adjustment between a third-party entity and a trucking company's transport vehicle real-time parameter data share authorizer, in accordance with an embodiment of the invention.

FIG. 20 shows a method (2000) of privacy control adjustments between a third-party entity and a transportation company's transport vehicle real-time parameter data share authorizer, in accordance with an embodiment of the invention. As shown in STEP 2001, in one embodiment of the invention, a third-party corporate partner entity requests a trucking company's data share authorizer a permission to open a private data field from a privacy-adjustable dataset. For example, the third-party corporate partner entity, using a TripShare partner mobile app executed on a smart phone, a notebook computer, or another electronic device, can send a permission request to the TripShare system in an attempt to receive an authorization to access a currently-private data field in a privacy-adjustable dataset of a vehicle information dataset, which is stored in a privacy control-adjustable onboard vehicle monitoring device and/or a TripShare system server controlled by the trucking company. The permission request from the third-party corporate partner entity's TripShare partner mobile app is typically wirelessly transmitted to the trucking company's TripShare system server vai a wireless data network.

Then, as shown in STEP 2002, the trucking company's data share authorizer grants or denies the access to the currently-private data field via the trucking company's TripShare system user interface. If the access to the currently-private data field is granted, as shown in STEP 2003, then the TripShare system server can change a data access flag for the private data field to "the third-party corporate partner entity allowed to access commercial vehicle-generated real-time vehicular parameters," as shown in STEP 2004. Then, the TripShare system server allows the third-party corporate partner entity to start receiving commercial vehicle-generated real-time vehicular parameters during a prespecified data share period from the trucking company, as shown in STEP 2005. On the other hand, if the trucking company's data share authorizer denies the currently-private data field access request by the third-party corporate partner entity, then the private data field stored in the privacy control-adjustable onboard vehicle monitoring device is restricted from being accessed by the TripShare partner mobile app executed on the third-party corporate partner's electronic device, as shown in STEP 2006.

Various embodiments of the present invention provide several key advantages to drivers, transportation companies, and outside corporate partners of transportation companies for achieving a sophisticated and fine balance of personal and corporate privacy protection and commercial fleet vehicle data analytics. For example, an advantage of an embodiment of the present invention is providing a novel privacy control-adjustable commercial vehicle electronic logging and trip data-sharing system that enables multiple data access depth authorization and monetization capabilities between a transportation company and a third-party corporate partner entity to the transportation company.

Another advantage of an embodiment of the present invention is providing a novel privacy control-adjustable commercial vehicle electronic logging and trip data-sharing system that enables the third-party corporate partner entity to gain onetime timer limit-based or itinerary-based in-vehicle sensor and trip-related data access rights from an underlying commercial vehicle monitoring system operated by the transportation company.

Furthermore, another advantage of an embodiment of the present invention is providing a novel dataset categorization scheme in the privacy control-adjustable commercial vehicle electronic logging and trip data-sharing system to create multiple-tier data access privileges that categorizes a "must-disclose" mandatory dataset and multiple tiers of privacy-adjustable datasets customized for industry-specific needs of third-party corporate partners in various industries, such as logistics brokers, retailers, product distributors, construction equipment companies, vehicle insurance companies, vehicle maintenance shops, safety consultants, and regulatory agencies.

In addition, another advantage of an embodiment of the present invention is providing one or more flexible user interfaces that enable a transportation company operator or a commercial vehicle driver to grant or deny requests by third-party corporate partners to access privacy-adjustable datasets accumulated by the transportation company operator.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A privacy control-adjustable commercial vehicle electronic logging device (ELD) and trip data-sharing system between a transportation company and a third-party corporate partner entity, the privacy control-adjustable commercial vehicle ELD and trip data-sharing system comprising:

a privacy control-adjustable onboard vehicle monitoring device capable of storing a vehicle information dataset collected from a vehicle's onboard computer or another vehicle-attached equipment;

a computer server with a CPU and a memory unit, wherein the computer server is operated by a vehicle monitoring personnel from the transportation company;

a vehicle monitoring and trip data-sharing software module at least partially executed on the CPU and the memory unit of the computer server operated by the vehicle monitoring personnel from the transportation company, wherein the vehicle monitoring and trip data-sharing software module includes a mandatory disclosure dataset monitoring sub-module, a privacy-adjustable dataset monitoring sub-module, a privacy-adjustable dataset access authorization decision sub-module, and a trip data-share authorization timer for the third-party corporate partner entity's time-limited case-by-case or trip-by-trip access to the privacy control-adjustable onboard vehicle monitoring device and the vehicle information dataset collected from the vehicle's onboard computer or another vehicle-attached equipment;

a wireless transceiver unit either integrated into or operatively connected to the privacy control-adjustable onboard vehicle monitoring device for transmission of at least a portion of the vehicle information dataset from the privacy control-adjustable onboard vehicle monitoring device to the computer server operated by the vehicle monitoring personnel;

the vehicle information dataset comprising a mandatory disclosure dataset and a privacy-adjustable dataset, wherein the mandatory disclosure dataset is shared with the third-party corporate partner entity external to the transportation company, when a partner key entered into the computer server is correct, and wherein the privacy-adjustable dataset is not shared with the third-party corporate partner entity even when the partner key entered into the computer server is correct, unless the privacy-adjustable dataset is currently flagged by the transportation company to grant access to the third-party corporate partner entity external to the transportation company; and a trip data share authorizer's user interface device belonging to the transportation company that grants or denies a privacy-adjustable data access request by the vehicle monitoring personnel or the third-party corporate partner entity.

2. The privacy control-adjustable commercial vehicle ELD and trip data-sharing system of claim 1, further comprising at least one of a satellite communication network and a cellular communication network for transmission of at least a portion of the vehicle information dataset from the privacy control-adjustable onboard vehicle monitoring device to the computer server operated by the vehicle monitoring personnel.

3. The privacy control-adjustable commercial vehicle ELD and trip data-sharing system of claim 1, wherein the privacy control-adjustable onboard vehicle monitoring device includes a device CPU, a device memory unit, a display driver unit, a GPS receiver unit, a power supply unit, a data storage unit, and an input and output interface, which is compatible to communicate in a OBDII standard protocol with a vehicle diagnostic module or a vehicle diagnostic chip.

4. The privacy control-adjustable commercial vehicle ELD and trip data-sharing system of claim 3, further comprising a touch screen display in the vehicle as a driver's user interface device.

5. The privacy control-adjustable commercial vehicle ELD and trip data-sharing system of claim 1, wherein the mandatory disclosure dataset comprises a first sub-dataset comprising vehicle diagnostics, trouble codes, and vehicle safety alert information, a second sub-dataset comprising device removal alarm information in case of rogue removal of the onboard vehicle monitoring device or an onboard diagnostic device, and a third sub-dataset comprising wild card information.

6. The privacy control-adjustable commercial vehicle ELD and trip data-sharing system of claim 1, wherein the privacy-adjustable dataset comprises a first sub-dataset comprising vehicle speed, engine rotations per minute, fuel usage, and miles driven, a second sub-dataset comprising location and GPS coordinate broadcasting, a sub-third dataset comprising a location broadcasting timer, and a fourth sub-dataset comprising other competitive intelligence, trade secret, or business confidential information specified by the trip data share authorizer.

7. The privacy control-adjustable commercial vehicle ELD and trip data-sharing system of claim 6, wherein another vehicle-attached equipment is at least one of a digital video recorder and an audio recorder with a microphone, and wherein the other competitive intelligence, trade secret, or business confidential information specified by the trip data share authorizer is a video or audio footage from the vehicle.

8. The privacy control-adjustable commercial vehicle ELD and trip data-sharing system of claim 1, wherein the trip data share authorizer's user interface device is a smart phone or another mobile electronic device which executes a mobile application program for receiving, granting, or denying the privacy-adjustable dataset access request by the vehicle monitoring personnel or the third-party corporate partner entity.

9. The privacy control-adjustable commercial vehicle ELD and trip data-sharing system of claim 1, wherein the computer server operated by the vehicle monitoring personnel is operatively connected to a display screen and displays at least some of the vehicle information dataset on the display screen in real time.

10. The privacy control-adjustable commercial vehicle ELD and trip data-sharing system of claim 1, wherein the trip data share authorizer's user interface device requires entry of a personal identification number (PIN) and a correct partner key associated with the third-party corporate partner entity for granting or denying access to the privacy-adjustable dataset access request by the vehicle monitoring personnel or the third-party corporate partner entity.

11. The privacy control-adjustable commercial vehicle ELD and trip data-sharing system of claim 1, wherein the vehicle is a truck, a van, a bus, a passenger car, a sports utility vehicle (SUV), a motorcycle, a construction service equipment with or without wheels, or an oil or mining service equipment with or without wheels.

12. The privacy control-adjustable commercial vehicle ELD and trip data-sharing system of claim 1, wherein the computer server operated by the vehicle monitoring personnel with an electronic consent from the driver's user interface is capable of changing a data access flag of a private data field in the privacy-adjustable dataset from "private" to "third-party corporate partner entity allowed to access commercial vehicle-generated real-time vehicular parameters."

13. A method of operating a privacy control-adjustable commercial vehicle ELD and trip data-sharing system for a particular privacy control adjustment in a vehicle, the method comprising steps of:

requesting a permission, with a partner key synthesized from a third-party corporate partner entity's electronic user interface connected to the privacy control-adjustable commercial vehicle ELD and trip data-sharing system, to open a private data field in a privacy-adjustable dataset of a vehicle information dataset originating from a vehicle operated by a transportation company, wherein the permission is transmitted by an electronic data network;

granting or denying the permission request by the third-party corporate partner entity using a trip data share authorizer's user interface device, which transmits a response signal to the privacy control-adjustable commercial vehicle ELD and trip data-sharing system for granting or denying access to the private data field;

receiving the response signal in the privacy control-adjustable commercial vehicle ELD and trip data-sharing system operated by the transportation company; and if the response signal grants the access to the private data field:

changing a data access flag for the private data field to "third-party corporate partner monitoring of commercial vehicle-generated vehicular parameters allowed"; and accessing the private data field, which is now allowed for additional monitoring by the third-party corporate partner entity external to the transportation company;

else if the response signal denies the access to the private data field:

keeping the private data field private from information access by the third-party corporate partner entity.

14. The method of claim 13, wherein the privacy control-adjustable commercial vehicle ELD and trip data-sharing system executes a vehicle monitoring and trip data-sharing software module in a CPU and a memory unit of a computer server.

15. The method of claim 14, wherein the vehicle monitoring and trip data-sharing software module includes a mandatory disclosure dataset monitoring sub-module, a privacy-adjustable dataset monitoring sub-module, a privacy-adjustable dataset access authorization decision sub-module, and a trip data share authorization timer sub-module.

16. The method of claim 13, wherein the electronic data network is at least one of a cellular communication network and a satellite communication network.

17. The method of claim 13, wherein the vehicle information dataset comprises a mandatory disclosure dataset and the privacy-adjustable dataset that incorporates the private data field.

18. The method of claim 13, wherein the trip data share authorizer's user interface device is an onboard vehicle user interface device or a mobile electronic device.

* * * * *